(12) United States Patent
Nuss et al.

(10) Patent No.: US 9,877,237 B2
(45) Date of Patent: *Jan. 23, 2018

(54) METHOD FOR MANAGING HETEROGENEOUS CELLULAR NETWORKS

(71) Applicant: CISCO TECHNOLOGY, INC., San Jose, CA (US)

(72) Inventors: Ziv Nuss, Tzur Yigal (IL); Itay Meir Mizrahi, Ness-Ziyonna (IL)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/832,148

(22) Filed: Aug. 21, 2015

(65) Prior Publication Data

US 2015/0365855 A1    Dec. 17, 2015

Related U.S. Application Data

(62) Division of application No. 13/693,434, filed on Dec. 4, 2012, now Pat. No. 9,167,444.

(51) Int. Cl.
*H04W 36/00* (2009.01)
*H04W 24/02* (2009.01)
(Continued)

(52) U.S. Cl.
CPC ....... *H04W 36/0061* (2013.01); *H04W 24/02* (2013.01); *H04W 36/04* (2013.01); *H04W 84/045* (2013.01)

(58) Field of Classification Search
None
See application file for complete search history.

(56) References Cited

U.S. PATENT DOCUMENTS

| 6,141,565 | A  | 10/2000 | Feuerstein et al. |
| 6,456,848 | B1 | 9/2002  | Freeman |

(Continued)

FOREIGN PATENT DOCUMENTS

| CN | 1334999   A | 2/2002 |
| CN | 101444125 A | 5/2009 |

(Continued)

OTHER PUBLICATIONS

"ETSI TR 136 902 V9.3.1 (May 2011) Technical Report: LTE; Evolved Universal Terrestrial Radio Access Network 9E-UTRAN); Self-configuring and self-optimizing network (SON) use cases and solutions (3GPP TR 36.902 version 9.3.1 Release 9)," ETSI, European Telecommunications Standards Institute, 650 Route des Lucioles F-06921 Sophia Antipolis Cedex—France, May 2011; 23 pages.

(Continued)

*Primary Examiner* — Brandon Renner
*Assistant Examiner* — Jay Vogel

(57) ABSTRACT

A method is provided for managing heterogeneous cellular networks. The method comprises obtaining measurement reports from wireless entities relating to the intensity at which signals are received by each wireless entity; based on these measurement reports, and/or on geographical information of HetNet elements, identifying a macro cell located at the vicinity of the small cells; selecting one of the small cells to be a gateway cell, and other small cells to be inner cells. The gateway cell is a small cell that receives, or mobile terminals connected thereto receive, signals transmitted by the macro cell at an intensity being at least similar to intensity at which these signals are received at the inner cells; identifying physical layer identifiers (PLIs) used at the macro cell; and determining PLIs for the gateway cell which (Continued)

are not currently used by the macro cell, and PLIs available for use by the inner cells.

18 Claims, 5 Drawing Sheets

(51) Int. Cl.
H04W 36/04 (2009.01)
H04W 84/04 (2009.01)

(56) References Cited

U.S. PATENT DOCUMENTS

| | | | |
|---|---|---|---|
| 6,463,296 B1 | 10/2002 | Esmailzadeh | |
| 6,600,924 B1* | 7/2003 | Sinivaara | H04W 36/04 370/331 |
| 6,771,934 B2 | 8/2004 | Demers | |
| 7,151,937 B2 | 12/2006 | Jin et al. | |
| 7,158,474 B1 | 1/2007 | Gerakoulis | |
| 7,379,739 B2 | 5/2008 | Rajkotia et al. | |
| 7,884,763 B2 | 2/2011 | Na et al. | |
| 7,974,652 B2 | 7/2011 | Gerlach | |
| 7,983,667 B2 | 7/2011 | Hart et al. | |
| 8,045,996 B2 | 10/2011 | Brunner et al. | |
| 8,078,185 B2 | 12/2011 | Sun | |
| 8,107,950 B2 | 1/2012 | Amerijoo et al. | |
| 8,126,495 B2 | 2/2012 | Wu | |
| 8,145,223 B2 | 3/2012 | Guey | |
| 8,145,252 B2 | 3/2012 | Sung et al. | |
| 8,170,544 B1 | 5/2012 | Satapathy et al. | |
| 8,194,630 B2 | 6/2012 | Qvarfordt | |
| 8,208,937 B2 | 6/2012 | Zhang | |
| 8,229,451 B2 | 7/2012 | Frenger et al. | |
| 8,270,976 B2 | 9/2012 | Simonsson et al. | |
| 8,275,376 B2 | 9/2012 | Vikberg | |
| 8,320,965 B2 | 11/2012 | Kwun | |
| 8,340,711 B1 | 12/2012 | Glass et al. | |
| 8,400,921 B2 | 3/2013 | Grayson et al. | |
| 8,483,743 B2 | 7/2013 | Dimou | |
| 8,538,337 B2 | 9/2013 | Damnjanovic | |
| 8,588,698 B2 | 11/2013 | Brisebois | |
| 8,611,299 B2 | 12/2013 | Yang et al. | |
| 8,619,563 B2 | 12/2013 | Madan et al. | |
| 8,639,243 B2 | 1/2014 | Radulescu et al. | |
| 8,687,585 B2 | 4/2014 | Marks et al. | |
| 8,694,044 B2 | 4/2014 | Hiltunen et al. | |
| 8,712,459 B2 | 4/2014 | Lim et al. | |
| 8,731,567 B2 | 5/2014 | Zhang | |
| 8,743,772 B2 | 6/2014 | Garavaglia et al. | |
| 8,755,791 B2 | 6/2014 | Bontu et al. | |
| 8,761,826 B2 | 6/2014 | Brown et al. | |
| 8,792,886 B2 | 7/2014 | Meshkati | |
| 8,797,983 B2 | 8/2014 | Sun | |
| 8,805,373 B2 | 8/2014 | Chayat | |
| 8,805,385 B2 | 8/2014 | Hunukumbure | |
| 8,830,936 B2 | 9/2014 | Ren | |
| 8,838,125 B2 | 9/2014 | Dalsgaard et al. | |
| 8,854,998 B2 | 10/2014 | Johansson et al. | |
| 8,862,134 B1 | 10/2014 | Zhou | |
| 8,874,126 B2 | 10/2014 | Jeong et al. | |
| 8,879,441 B2 | 11/2014 | Hunukumbure | |
| 8,983,470 B1 | 3/2015 | Ryan | |
| 9,014,004 B2 | 4/2015 | Nuss et al. | |
| 9,031,591 B2 | 5/2015 | Ma et al. | |
| 9,094,831 B2 | 7/2015 | Borran | |
| 9,143,995 B2 | 9/2015 | Okmyanskiy et al. | |
| 9,148,838 B2 | 9/2015 | Yanover et al. | |
| 9,167,444 B2 | 10/2015 | Nuss et al. | |
| 9,197,358 B2 | 11/2015 | Hejazi | |
| 9,219,816 B2 | 12/2015 | Grayson | |
| 9,313,004 B2 | 4/2016 | Yanover et al. | |
| 9,332,458 B2 | 5/2016 | Nuss et al. | |
| 9,344,970 B2 | 5/2016 | Uplenchwar et al. | |
| 9,490,953 B2 | 11/2016 | Yanover et al. | |
| 9,497,708 B2 | 11/2016 | Uplenchwar et al. | |
| 9,544,857 B2 | 1/2017 | Carter et al. | |
| 9,648,569 B2 | 5/2017 | Madan et al. | |
| 9,655,102 B2 | 5/2017 | Uplenchwar et al. | |
| 2002/0019245 A1 | 2/2002 | Longoni | |
| 2004/0085909 A1 | 5/2004 | Soliman | |
| 2004/0132486 A1 | 7/2004 | Halonen | |
| 2004/0213170 A1 | 10/2004 | Bremer | |
| 2005/0063389 A1 | 3/2005 | Elliott | |
| 2005/0064820 A1 | 3/2005 | Park et al. | |
| 2005/0215251 A1 | 9/2005 | Krishnan | |
| 2005/0282572 A1 | 12/2005 | Wigard et al. | |
| 2006/0068712 A1 | 3/2006 | Kroboth et al. | |
| 2006/0073791 A1 | 4/2006 | Senarath | |
| 2006/0229087 A1 | 10/2006 | Davis et al. | |
| 2007/0008885 A1 | 1/2007 | Bonner | |
| 2007/0082620 A1 | 4/2007 | Zhang et al. | |
| 2007/0086406 A1 | 4/2007 | Papasakellariou | |
| 2007/0115874 A1 | 5/2007 | Usuda | |
| 2007/0177501 A1 | 8/2007 | Papasakellariou | |
| 2007/0253372 A1 | 11/2007 | Nakayasu | |
| 2007/0280170 A1 | 12/2007 | Kawasaki | |
| 2008/0045227 A1 | 2/2008 | Nagai | |
| 2008/0107074 A1 | 5/2008 | Salmenkaita et al. | |
| 2008/0139197 A1 | 6/2008 | Misra et al. | |
| 2008/0188265 A1 | 8/2008 | Carter et al. | |
| 2008/0268833 A1 | 10/2008 | Huang | |
| 2009/0005030 A1 | 1/2009 | Han | |
| 2009/0054047 A1 | 2/2009 | Kylvaja | |
| 2009/0061778 A1 | 3/2009 | Vrzic | |
| 2009/0067370 A1 | 3/2009 | Kim | |
| 2009/0092080 A1* | 4/2009 | Balasubramanian | H04J 11/0093 370/328 |
| 2009/0092088 A1 | 4/2009 | Kokku | |
| 2009/0129284 A1 | 5/2009 | Jung et al. | |
| 2009/0129291 A1 | 5/2009 | Gupta | |
| 2009/0197632 A1 | 8/2009 | Ghosh | |
| 2009/0232074 A1 | 9/2009 | Yang et al. | |
| 2009/0270109 A1 | 10/2009 | Wang | |
| 2009/0323530 A1 | 12/2009 | Trigui et al. | |
| 2010/0009634 A1 | 1/2010 | Budianu | |
| 2010/0029282 A1 | 2/2010 | Stamoulis et al. | |
| 2010/0034157 A1 | 2/2010 | Stolyar et al. | |
| 2010/0056184 A1 | 3/2010 | Vakil | |
| 2010/0093358 A1 | 4/2010 | Cheong et al. | |
| 2010/0099424 A1 | 4/2010 | Centonza | |
| 2010/0112982 A1 | 5/2010 | Singh et al. | |
| 2010/0177722 A1 | 7/2010 | Guvenc | |
| 2010/0227611 A1 | 9/2010 | Schmidt et al. | |
| 2010/0240314 A1 | 9/2010 | Chang | |
| 2010/0248737 A1 | 9/2010 | Smith | |
| 2010/0260036 A1 | 10/2010 | Molnar et al. | |
| 2010/0260068 A1 | 10/2010 | Bhatt et al. | |
| 2010/0267338 A1 | 10/2010 | Chiu | |
| 2010/0267408 A1 | 10/2010 | Lee et al. | |
| 2010/0275083 A1 | 10/2010 | Nam et al. | |
| 2010/0279628 A1 | 11/2010 | Love et al. | |
| 2010/0311449 A1 | 12/2010 | Whinnett | |
| 2010/0317351 A1 | 12/2010 | Gerstenberger | |
| 2010/0322109 A1 | 12/2010 | Ahn | |
| 2011/0034174 A1 | 2/2011 | Xu | |
| 2011/0039539 A1* | 2/2011 | Maida | H04B 1/7083 455/422.1 |
| 2011/0039570 A1 | 2/2011 | Maida et al. | |
| 2011/0070911 A1 | 3/2011 | Zhang | |
| 2011/0077016 A1 | 3/2011 | Stolyar et al. | |
| 2011/0081865 A1 | 4/2011 | Xiao | |
| 2011/0086614 A1 | 4/2011 | Brisebois | |
| 2011/0092209 A1 | 4/2011 | Gaal | |
| 2011/0098072 A1 | 4/2011 | Kim | |
| 2011/0201277 A1 | 4/2011 | Eguchi | |
| 2011/0110316 A1 | 5/2011 | Chen et al. | |
| 2011/0128862 A1 | 6/2011 | Kallin | |
| 2011/0136478 A1 | 6/2011 | Trigui | |
| 2011/0151877 A1 | 6/2011 | Tafreshi | |
| 2011/0151881 A1 | 6/2011 | Chou | |
| 2011/0171911 A1 | 7/2011 | Liu | |
| 2011/0176497 A1 | 7/2011 | Gopalakrishnan | |
| 2011/0182375 A1 | 7/2011 | Kim et al. | |

(56) References Cited

U.S. PATENT DOCUMENTS

| | | |
|---|---|---|
| 2011/0188441 A1 | 8/2011 | Kim |
| 2011/0194423 A1 | 8/2011 | Cho |
| 2011/0195730 A1 | 8/2011 | Chami |
| 2011/0195732 A1 | 8/2011 | Kim |
| 2011/0211514 A1 | 9/2011 | Hamalainin |
| 2011/0223964 A1 | 9/2011 | Ebiko |
| 2011/0235598 A1 | 9/2011 | Hilborn |
| 2011/0250881 A1 | 10/2011 | Michel et al. |
| 2011/0287755 A1 | 11/2011 | Cho |
| 2011/0306347 A1 | 12/2011 | Choi |
| 2011/0310879 A1 | 12/2011 | Wu |
| 2011/0317742 A1 | 12/2011 | Kawahatsu |
| 2012/0004003 A1 | 1/2012 | Shaheen et al. |
| 2012/0015655 A1 | 1/2012 | Lee |
| 2012/0028584 A1 | 2/2012 | Zhang et al. |
| 2012/0046026 A1 | 2/2012 | Chande |
| 2012/0046063 A1 | 2/2012 | Chande |
| 2012/0083201 A1 | 4/2012 | Truong |
| 2012/0087247 A1 | 4/2012 | Min et al. |
| 2012/0100849 A1 | 4/2012 | Marisco |
| 2012/0115534 A1 | 5/2012 | Luo |
| 2012/0129537 A1 | 5/2012 | Liu et al. |
| 2012/0157155 A1 | 6/2012 | Cho |
| 2012/0176980 A1 | 7/2012 | Moon et al. |
| 2012/0178451 A1 | 7/2012 | Kubota |
| 2012/0231797 A1 | 9/2012 | Van Phan et al. |
| 2012/0235774 A1 | 9/2012 | Guey et al. |
| 2012/0238263 A1 | 9/2012 | Caretti et al. |
| 2012/0243431 A1 | 9/2012 | Chen et al. |
| 2012/0258720 A1 | 10/2012 | Tinnakornsurisphap et al. |
| 2012/0265888 A1 | 10/2012 | Roeland et al. |
| 2012/0282964 A1 | 11/2012 | Xiao et al. |
| 2013/0003697 A1 | 1/2013 | Adjakple et al. |
| 2013/0005388 A1 | 1/2013 | Naka |
| 2013/0021962 A1 | 1/2013 | Hu et al. |
| 2013/0044704 A1 | 2/2013 | Pang |
| 2013/0077482 A1 | 3/2013 | Krishna et al. |
| 2013/0079007 A1 | 3/2013 | Nagaraja et al. |
| 2013/0107798 A1 | 5/2013 | Gao et al. |
| 2013/0109380 A1* | 5/2013 | Centonza ......... H04W 36/0083 455/434 |
| 2013/0121257 A1 | 5/2013 | He et al. |
| 2013/0136072 A1 | 5/2013 | Bachmann et al. |
| 2013/0137447 A1 | 5/2013 | Zhang et al. |
| 2013/0142116 A1 | 6/2013 | Prakash |
| 2013/0157680 A1 | 6/2013 | Morita |
| 2013/0163543 A1 | 6/2013 | Freda et al. |
| 2013/0182680 A1 | 7/2013 | Choi et al. |
| 2013/0210431 A1 | 8/2013 | Abe |
| 2013/0229945 A1 | 9/2013 | Cha et al. |
| 2013/0242748 A1 | 9/2013 | Mangalvedhe et al. |
| 2013/0250875 A1 | 9/2013 | Chen et al. |
| 2013/0294356 A1 | 11/2013 | Bala et al. |
| 2013/0308531 A1 | 11/2013 | So et al. |
| 2013/0310019 A1 | 11/2013 | Visotsky |
| 2013/0310103 A1 | 11/2013 | Madan et al. |
| 2013/0326001 A1 | 12/2013 | Jorgensen et al. |
| 2013/0331079 A1 | 12/2013 | Racz et al. |
| 2013/0337821 A1 | 12/2013 | Clegg |
| 2013/0339783 A1 | 12/2013 | Alonso et al. |
| 2013/0343304 A1 | 12/2013 | Kaippallimalil et al. |
| 2013/0343755 A1 | 12/2013 | Cvijetic et al. |
| 2014/0003225 A1 | 1/2014 | Mann et al. |
| 2014/0010086 A1 | 1/2014 | Etemad et al. |
| 2014/0011505 A1 | 1/2014 | Liao |
| 2014/0018073 A1 | 1/2014 | Frenger |
| 2014/0029524 A1 | 1/2014 | Dimou et al. |
| 2014/0056220 A1 | 2/2014 | Poitau et al. |
| 2014/0056278 A1 | 2/2014 | Marinier et al. |
| 2014/0073304 A1 | 3/2014 | Brisebois |
| 2014/0078986 A1 | 3/2014 | Kaippallimalil et al. |
| 2014/0086226 A1 | 3/2014 | Zhao et al. |
| 2014/0087747 A1 | 3/2014 | Kronestedt |
| 2014/0092765 A1 | 4/2014 | Agarwal et al. |
| 2014/0098757 A1 | 4/2014 | Khandekar |
| 2014/0112251 A1 | 4/2014 | Kim et al. |
| 2014/0113643 A1 | 4/2014 | Ma et al. |
| 2014/0146732 A1 | 5/2014 | Olufunmilola et al. |
| 2014/0148149 A1 | 5/2014 | Kwan |
| 2014/0148179 A1 | 5/2014 | Das et al. |
| 2014/0153439 A1 | 6/2014 | Nuss et al. |
| 2014/0155081 A1 | 6/2014 | Nuss |
| 2014/0155109 A1 | 6/2014 | Vaidya et al. |
| 2014/0169409 A1 | 6/2014 | Ma et al. |
| 2014/0170965 A1 | 6/2014 | Li |
| 2014/0185467 A1 | 7/2014 | Heo |
| 2014/0198678 A1 | 7/2014 | Kim et al. |
| 2014/0200001 A1 | 7/2014 | Song |
| 2014/0211739 A1 | 7/2014 | Kim et al. |
| 2014/0213274 A1 | 7/2014 | Weber et al. |
| 2014/0219117 A1 | 8/2014 | Meshkati et al. |
| 2014/0220990 A1 | 8/2014 | Lorca Hernando |
| 2014/0226736 A1 | 8/2014 | Niu et al. |
| 2014/0233468 A1 | 8/2014 | Hejazi |
| 2014/0233530 A1 | 8/2014 | Damnjanovic |
| 2014/0241316 A1 | 8/2014 | Okmyanskiy et al. |
| 2014/0243005 A1 | 8/2014 | Yanover et al. |
| 2014/0269355 A1 | 9/2014 | Monogioudis et al. |
| 2014/0273852 A1 | 9/2014 | McCormack et al. |
| 2014/0274195 A1 | 9/2014 | Singh |
| 2014/0293906 A1 | 10/2014 | Chang et al. |
| 2014/0302851 A1 | 10/2014 | Yiu |
| 2014/0302859 A1 | 10/2014 | Nama |
| 2014/0307685 A1 | 10/2014 | Takano |
| 2014/0321304 A1 | 10/2014 | Yu |
| 2014/0328277 A1 | 11/2014 | Xiao et al. |
| 2014/0328327 A1 | 11/2014 | Xiao et al. |
| 2014/0335909 A1 | 11/2014 | Czerepinski |
| 2014/0378145 A1 | 12/2014 | Legg |
| 2015/0004975 A1 | 1/2015 | Yamamoto |
| 2015/0011222 A1 | 1/2015 | Brisebois et al. |
| 2015/0011229 A1 | 1/2015 | Morita et al. |
| 2015/0018028 A1 | 1/2015 | Uplenchwar et al. |
| 2015/0038190 A1 | 2/2015 | Carter et al. |
| 2015/0055479 A1 | 2/2015 | Reider |
| 2015/0063223 A1 | 3/2015 | Shen |
| 2015/0063225 A1 | 3/2015 | Kanamarlapudi |
| 2015/0063231 A1 | 3/2015 | Seo et al. |
| 2015/0087325 A1 | 3/2015 | Nuss et al. |
| 2015/0105025 A1 | 4/2015 | Zhang |
| 2015/0138981 A1 | 5/2015 | Nuss et al. |
| 2015/0141027 A1 | 5/2015 | Tsui et al. |
| 2015/0146594 A1 | 5/2015 | Grayson et al. |
| 2015/0148036 A1 | 5/2015 | Grayson et al. |
| 2015/0208425 A1 | 7/2015 | Caretti et al. |
| 2015/0237637 A1 | 8/2015 | Venkatraman |
| 2015/0256314 A1 | 9/2015 | Gauvreau et al. |
| 2015/0282033 A1 | 10/2015 | Lunden |
| 2015/0282104 A1 | 10/2015 | Damnjanovic |
| 2015/0312778 A1 | 10/2015 | Chandrasekhar et al. |
| 2015/0318994 A1 | 11/2015 | Walsh et al. |
| 2015/0351072 A1 | 12/2015 | Okmyanskiy et al. |
| 2015/0365865 A1 | 12/2015 | Bakker |
| 2015/0373698 A1 | 12/2015 | Uplenchwar et al. |
| 2015/0382367 A1 | 12/2015 | Yanover et al. |
| 2016/0073426 A1 | 3/2016 | Bull et al. |
| 2016/0094319 A1 | 3/2016 | Chaudhuri |
| 2016/0127069 A1 | 5/2016 | Nuss et al. |
| 2016/0150442 A1 | 5/2016 | Kwan |
| 2016/0165485 A1 | 6/2016 | Kwan |
| 2016/0211955 A1 | 7/2016 | Wu |
| 2016/0242122 A1 | 8/2016 | Yue |
| 2016/0315728 A1 | 10/2016 | Palenius |
| 2016/0373202 A1 | 12/2016 | Nuss et al. |
| 2017/0034795 A1 | 2/2017 | Madan |
| 2017/0041938 A1 | 2/2017 | Nabar |
| 2017/0064707 A1 | 3/2017 | Xiao |
| 2017/0150384 A1 | 5/2017 | Rune |

FOREIGN PATENT DOCUMENTS

| | | |
|---|---|---|
| CN | 102 271 414 | 12/2011 |
| CN | 104684052 A | 6/2015 |
| EP | 1322048 | 6/2003 |

(56) References Cited

FOREIGN PATENT DOCUMENTS

| | | |
|---|---|---|
| EP | 1718090 | 11/2006 |
| EP | 1895801 | 3/2008 |
| EP | 2166714 | 3/2010 |
| EP | 2296394 | 3/2011 |
| EP | 2337395 | 6/2011 |
| EP | 2395701 | 12/2011 |
| EP | 2445265 | 4/2012 |
| EP | 2466972 | 6/2012 |
| EP | 2566261 | 3/2013 |
| EP | 2018781 | 4/2013 |
| EP | 2632072 | 8/2013 |
| EP | 2728926 | 5/2014 |
| EP | 2770773 | 8/2014 |
| EP | 2832150 | 2/2015 |
| EP | 2879444 | 6/2015 |
| GB | 2496908 | 5/2013 |
| GB | 2518584 | 4/2015 |
| WO | WO1998/024199 | 6/1998 |
| WO | WO2000/038351 | 6/2000 |
| WO | WO2007/074373 | 7/2007 |
| WO | WO2007/133135 | 11/2007 |
| WO | WO2010/006909 | 1/2010 |
| WO | WO2010/018929 | 2/2010 |
| WO | WO2010/064110 | 6/2010 |
| WO | WO2010/0125151 | 11/2010 |
| WO | WO2011/085238 | 7/2011 |
| WO | WO2011/088465 | 7/2011 |
| WO | WO2011/090908 | 7/2011 |
| WO | WO2011/137345 | 11/2011 |
| WO | WO2012/148009 | 1/2012 |
| WO | WO2012/055984 | 5/2012 |
| WO | WO2012/079604 | 6/2012 |
| WO | WO2013/005016 | 1/2013 |
| WO | WO2013/041574 | 3/2013 |
| WO | WO2013/082245 | 6/2013 |
| WO | WO2013/086659 | 6/2013 |
| WO | WO2013/112082 | 8/2013 |
| WO | WO2013/144950 | 10/2013 |
| WO | WO2013/169991 | 11/2013 |
| WO | WO2014/001025 | 3/2014 |
| WO | WO2014/059935 | 4/2014 |
| WO | WO2014/064674 | 5/2014 |
| WO | WO2014/071308 | 5/2014 |
| WO | WO2014/0087392 | 6/2014 |
| WO | WO2014/087393 | 6/2014 |

OTHER PUBLICATIONS

"ETSI TS 123 007 V12.6.0 (Oct. 2014) Technical Specification: Digital Cellular Telecommunications System (Phase 2+); Universal Mobile Telecommunications System (UMTS); LTE; Restoration procedures (EGPP TS 23.007 version 12.6.0 Release 12)," ETSI, 650 Route des Lucioles, F-06921, Sophia Antipolis Cedex—France, Oct. 2014; 93 pages.

"ETSI TS 123 401 V9.5.0 (Jun. 2010) Technical Specification: LTE; General Packet Radio Service (GPRS) enhancements for Evolved Universal Terrestrial Radio Access Network (E-UTRAN) access (3GPP TS 23.401 version 9.5.0 Release 9)," ETSI, 650 Route des Lucioles, F06921, Sophia Antipolis Cedex—France, Jun. 2010; See Section 4, pp. 15-46.

"ETSI TS 123 401 V11.10.0 (Jul. 2014) Technical Specification: LTE; General Packet Radio Service (GPRS) enhancements for Evolved Universal Terrestrial Radio Access Network (E-UTRAN) access (3GPP TS 23.401 version 11.10.0 Release 11)," [Relevant Sections 5.3.1.2 and 5.3.4.3 only]; ETSI, 650 Route des Lucioles, F-06921, Sophia Antipolis Cedex—France, Jul. 2014.

"ETSI TS 123 401 V12.6.0 (Sep. 2014) Technical Specification: LTE; General Packet Radio Service (GPRS) enhancements for Evolved Universal Terrestrial Radio Access Network (E-UTRAN) access (3GPP TS 23.401 version 12.6.0 Release 12)," ETSI, 650 Route des Lucioles, F-06921 Sophia Antipolis Cedex—France, Sep. 2014; 308 pages.

"ETSI TS 123 401 V12.70 (Jan. 2015) Technical Specification: LTE; General Packet Radio Service (GPRS) enhancements for Evolved Universal Terrestrial Radio Access Network (E-UTRAN) access (EGPP TS 23.401 version 12.7.0 Release 12)", Section 4 only, European Telecommunications Standards Institute, 650 Route des Lucioles, F-06921 Sophia Antipolis Cedex, France; Jan. 2015; 77 pages.

"ETSI TS 125 133 V12.6.0 (Jan. 2013) Technical Specification: Universal Mobile Telecommunications System 9UMTS); Requirements for support of radio resource management (FDD) (3GPP TS 25.133 version 12.6.0 Release 12);" ETSI, European Telecommunications Standards Institute 2012, 650 Route des Lucioles, F-06921 Sophia Antipolis Cedex—France, Jan. 2015; 368 pages.

"ETSI TS 125 211 V11.5.0 (Jul. 2014) Technical Specification: Universal Mobile Telecommunications System (UMTS); Physical channels and mapping of transport channels onto physical channels (FDD) (3GPP TS 25.211 version 11.5.0 Release 11)," [Relevant Section 7 only]; ETSI, 650 Route des Lucioles, F-06921, Sophia Antipolis Cedex—France, Jul. 2014.

"ETSI TS 125 215 V 12.0.0 (Sep. 2014) Technical Specification: Universal Mobile Telecommunications System (UMTS); Physical layer; Measurements (FDD) (3GPP TS 25.215 version 12.0.0 Release 12);" ETSI, European Telecommunications Standards Institute 2012, 650 Route des Lucioles, F-06921 Sophia Antipolis Cedex—France, Sep. 2014; 26 pages.

"ETSI TS 125 224 V12.0.0 (Sep. 2014) Technical Specification: Universal Mobile Telecommunications System (UMTS); Physical layer procedures (TDD) (3GPP TS 25.224.version 12.0.0 Release 12);" ETSI, European Telecommunications Standards Institute 2012, 650 Route des Lucioles, F-06921 Sophia Antipolis Cedex—France, Sep. 2014; 86 pages.

"ETSI TS 125 331 V11.10.0 (Jul. 2014) Technical Specification: Universal Mobile Telecommunications System (UMTS); Radio Resource Control (RRC); Protocol Specification," ETSI, 650 Route des Lucioles, F-06921, Sophia Antipolis Cedex—France, Jul. 2014, © European Telecommunications Standards Institute 2014. All Rights Reserved. [Relevant Portions: §7.2.2 pp. 55-58; §8.1.2 pp. 105-108; §8.1.4 pp. 126-129; §8.3.1 pp. 215-260; §8.3.8-8.3.9 pp. 289-292; §8.5.21 pp. 357-365; §10.2.7 pp. 620-623; Annex B.3 pp. 2045-2052].

"ETSI TS 125 367 V9.4.0, Universal Mobile Telecommunications System (UMTS); Mobility procedures for Home Node B (HNB); Overall description; Stage 2 (3GPP T525.367 version 9.4.0 Release 9)", European Telecommunications Standards Institute, 650 Route des Lucioles, F-06921 Sophia Antipolis Cedex, France, Jun. 2010; 17 pages.

"ETSI TS-125-469 V9.3.0 (Oct. 2010) Technical Specification: Universal Mobile Telecommunications System (UMTS); UTRAN Iuh interface Home Node B (HNG) Application Part (HNBAP) signaling (3GPP TS 25.469 version 9.3.0 Release 9)," © European Telecommunications Standards Institute 2010; Oct. 2010; 64 pages.

"ETSI TS 125 469 v11.2.0, Universal Mobile Telecommunications System (UMTS); UTRAN Iuh interface Home Node B (HNB); Application Part (HNBAP) signalling (3GPP T525.469 version 11.2.0 Release 11)," European Telecommunications Standards Institute, 650 Route des Lucioles, F-06921 Sophia Antipolis Cedex, France, Apr. 2013, 78 pages.

"ETSI TS 129 061 V12.7.0 (Oct. 2014) Technical Specification: Digital cellular telecommunications system (Phase 2+); Universal Mobile Telecommunications System (UMTS); LTE; Interworking between the Public Land Mobile Network (PLMN) supporting packet based services and Packet Data Networks (PDN) (3GPP TS 29.061 version 12.7.0 Release 12)," ETSI, 650 Route des Lucioles, F-06921, Sophia Antipolis Cedex—France, Oct. 2014; 170 pages.

"ETSI TS 129 212 V12.6.0 (Oct. 2014) Technical Specification: Universal Mobile Telecommunications System (UMTS); LTE; Policy and Charging Control (PCC); Reference Points (EGPP TS 29.212 version 12.6.0 Release 12)," ETSI, 650 Route des Lucioles, F-06921, Sophia Antipolis Cedex—France, Oct. 2014, 232 pages.

"ETSI TS 129 213 V12.5.0 (Oct. 2014) Technical Specification: Digital Cellular Telecommunications System (Phase 2+); Universal Mobile Telecommunications System (UMTS); LTE; Policy and charging control signalling flows and Quality of Service (QoS)

(56) References Cited

OTHER PUBLICATIONS parameter mapping (3GPP TS 29.213 version 12.5.0 Release 12)," [Relevant Sections 3, 4, 8 and 8 only], ETSI, 650 Route des Lucioles, F-06921, Sophia Antipolis Cedex—France, Oct. 2014.
"ETSI TS 129 214 V12.5.0 (Oct. 2014) Technical Specification: Universal Mobile Telecommunications System (UMTS); LTE; Policy and charging control over Rx reference point (3GPP TS 29.214 version 12.5.0 Release 12)," ETSI, 650 Route des Lucioles, F-06921, Sophia Antipolis Cedex—France, Oct. 2014; 64 pages.
"ETSI TS 136 111 V12.0.0 (Oct. 2014) Technical Specification: LTE; Location Measurement Unit (LMU) performance specification; Network based positioning systems in Evolved Universal Terrestrial Radio Access Network (E-UTRAN) (3GPP TS 36.111 version 12.0.0 Release 12);" ETSI, European Telecommunications Standards Institute 2012, 650 Route des Lucioles, F-06921 Sophia Antipolis Cedex—France; Oct. 2014.
"ETSI TS 136 133 V12.5.0 (Nov. 2014) Technical Specification: LTE; Evolved Universal Terrestrial Radio Access (E-UTRA); Requirements for support of radio resource management (3GPP TS 36.133 version 12.5.0 Release 12)," [Relevant Sections 8-10 only]; ETSI, 650 Route des Lucioles, F-06921, Sophia Antipolis Cedex—France, Nov. 2014.
"ETSI TS 136 133 V12-9-0 (Oct. 2015) Technical Specification: LTE; Evolved Universal Terrestrial Radio Access (E-UTRA); Requirements for support of Radio Resource management (3GPP TS 36.133 version 12.9.0 Release 12)," ETSI, European Telecommunications Standards Institute, 650 Route des Lucioles F-06921 Sophia Antipolis Cedex—France, Oct. 2015 Sections 1 thru 9 only; 252 pages.
"ETSI TS 136 201 V12.1.0 (Feb. 2015) Technical Specificaton: LTE; Evolved Universal Terrestrial Radio Access (E-UTRA); LTE physical layer; General description (3GPP TS 36.201 version 12.1.0 Release 12);" ETSI, European Telecommunications Standards Institute 2012, 650 Route des Lucioles, F-06921 Sophia Antipolis Cedex—France, Feb. 2015; 15 pages.
"ETSI TS 136 211 V12.5.0 (Apr. 2015) Technical Specification: LTE; Evolved Universal Terrestrial Radio Access (E-UTRA); Physical channels and modulation (3GPP TS 36.211 version 12.5.0 Release 12);" ETSI, European Telecommunications Standards Institute, 650 Route des Lucioles F-06921 Sophia Antipolis Cedex—France; Apr. 2015.
"ETSI TS 136 213 V12.4.0 (Feb. 2015) Technical Specification: LTE; Evolved Universal Terrestrial Radio Access (E-UTRA); Physical layer procedures (3GPP TS 36.213 version 12.4.0 Release 12);" ETSI, European Telecommunications Standards Institute 2012, 650 Route des Lucioles F-06921 Sophia Antipolis Cedex—France, Feb. 2015; 227 pages.
"ETSI TS 136 213 V12.7.0 (Oct. 2015) Technical Specification: LTE; Evolved Universal Terrestrial Radio Access (E-UTRA); Physical layer procedures (3GPP TS 36.213 version 12.7.0 Release 12);" ETSI, European Telecommunications Standards Institute, 650 Route des Lucioles F-06921 Sophia Antipolis Cedex—France, Oct. 2015; 243 pages.
"ETSI TS 136 213 V9.3.0 (Oct. 2010) Technical Specification: LTE; Evolved Universal Terrestrial Radio Access (E-UTRA); Physical layer procedures (3GPP TS 36.213 version 9.3.0 Release 9);" ETSI, European Telecommunications Standards Institute 2012, 650 Route des Lucioles, F-06921 Sophia Antipolis Cedex—France; Oct. 2010.
"ETSI TS 136 214 V9.2.0 (Jun. 2010) Technical Specification: LTE; Evolved Universal Terrestrial Radio Access (E-UTRA); Physical layer; Measurements (3GPP TS 36.214 version 9.2.0 Release 9);" ETSI, European Telecommunications Standards Institute 2012, 650 Route des Lucioles, F-06921 Sophia Antipolis Cedex—France; Jun. 2010.
"ETSI TS 136 300 V12-7-0 (Oct. 2015) Techinical Specification: LTE; Evolved Universal Terrestrial Radio Access (E-UTRA) and Evolved Universal Terrestrial Radio Access Network (E-UTRAN); Overall description; Stage 2 (3GPP TS 36.300 version 12.7.0 Release 12);" ETSI, European Telecommunications Standards Institute, 650 Route des Lucioles F-06921 Sophia Antipolis Cedex—France, Oct. 2015; 264 pages.
"ETSI TS 136 304 V12-6-0 (Nov. 2015) Technical Specification: LTE; Evolved Universal Terrestrial Radio Access (E-UTRA); User Equipment (UE) procedures in idle mode (3GPP TS 36.304 version 12.6.0 Release 12);" ETSI, European Telecommunications Standards Institute, 650 Route des Lucioles F-06921 Sophia Antipolis Cedex—France, Nov. 2015; 40 pages.
"ETSI TS 136 321 V12.7.0 (Oct. 2015) Technical Specification: LTE; Evolved Universal Terrestrial Radio Access (E-UTRA); Medium Access Control (MAC) protocol specification (3GPP TS 36.321 version 12.7.0 Release 12);" ETSI, European Telecommunications Standards Institute, 650 Route des Lucioles F-06921 Sophia Antipolis Cedex—France, Oct. 2015; 79 pages.
"ETSI TS 136 331 V12.3.0 (Sep. 2014) Technical Specificaton: LTE; Evolved Universal Terrestrial Radio Access (E-UTRA); Radio Resource Control (RRC); Protocol specification (3GPP TS 36.311 version 12.3.0 Release 12)," [Relevant Section 5.3.2 only]; ETSI, 650 Route des Lucioles, F-06921, Sophia Antipolis Cedex—France, Sep. 2014.
"ETSI TS 136 331 V12.7.0 (Oct. 2015) Technical Specification: LTE; Evolved Universal Terrestrial Radio Access (E-UTRA); Radio Resource Control (RRC); Protocol Specification (3GPP TS 36.331 version 12.7.0 Release 12);" ETSI, European Telecommunications Standards Institute, 650 Route des Lucioles F-06921 Sophia Antipolis Cedex—France, Oct. 2015; 455 pages.
"ETSI TS 136 423 V8.3.0 (Nov. 2008) Technical Specification: LTE; Evolved Universal Terrestrial Radio Access Network (E-UTRAN); X2 Application Protocol (X2AP) (3GPP TS 36.423 version 8.3.0 Release 8);" ETSI, European Telecommunications Standards Institute 2012, 650 Route des Lucioles F-06921 Sophia Antipolis Cedex—France; Nov. 2008.
"ETSI TS 136 211 V12.4.0 (Feb. 2015) Technical Specification: LTE; Evolved Universal Terrestrial Radio Access (E-UTRA); Physical channels and modulation (3GPP TS 36.211 version 12.4.0 Release 12);" ETSI, European Telecommunications Standards Institute 2012, 650 Route des Lucioles, F-06921 Sophia Antipolis Cedex—France, Feb. 2015; 126 pages.
"ETSI TS 136 211 V12.5.0 (Apr. 2015) Technical Specification: LTE; Evolved Universal Terrestrial Radio Access (E-UTRA); Physical channels and modulation (3GPP TS 36.211 version 12.5.0 Release 12)," ETSI, European Telecommunications Standards Institute 2012, 650 Route des Lucioles, F-06921 Sophia Antipolis Cedex—France, Apr. 2015; 139 pages.
"ETSI TS 136 212 V12.3.0 (Feb. 2015) Technical Specification: LTE; Evolved Universal Terrestrial Radio Access (E-UTRA); Multiplexing and channel coding (3GPP TS 36.212 version 12.3.0 Release 12);" ETSI, European Telecommunications Standards Institute 2012, 650 Route des Lucioles, F-06921 Sophia Antipolis Cedex—France, Feb. 2015; 91 pages.
"ETSI TS 136 213 V 12.4.0 (Feb. 2015) Technical Specification: LTE; Evolved Universal Terrestrial Radio Access (E-UTRA); Physical layer procedures (3GPP TS 36.213 version 12.4.0 Release 12);" ETSI, European Telecommunications Standards Institute 2012, 650 Route des Lucioles, F-06921 Sophia Antipolis Cedex—France, Feb. 2015; 227 pages.
"ETSI TS 136 212 V12.6.0 (Oct. 2015) Technical Specification: LTE; Evolved Universal Terrestrial Radio Access (E-UTRA); Multiplexing and channel coding (3GPP TS 36.212 version 12.6.0 Release 12);" ETSI, European Telecommunications Standards Institute, 650 Route des Lucioles F-06921 Sophia Antipolis Cedex—France, Oct. 2015; 96 pages.
"ETSI TS 136 214 V10.1.0 (Apr. 2011) Technical Specification: LTE; Evolved Universal Terrestrial Radio Access (E-UTRA); Physical layer; Measurements (3GPP TS 36.214 version 10.1.0 Release 10);" ETSI, European Telecommunications Standards Institute 2012, 650 Route des Lucioles, F-06921 Sophia Antipolis Cedex—France, Apr. 2011; 15 pages.
"ETSI TS 136 300 V12.4.0 (Feb. 2015) Technical Specification: LTE; Evolved Universal Terrestrial Radio Access (E-UTRA) and Evolved Universal Terrestrial Radio Access Network (E-UTRAN); Overall description; Stage 2 (3GPP TS 36.300 version 12.4.0

(56) References Cited

OTHER PUBLICATIONS

Release 12);" ETSI, European Telecommunications Standards Institute 2012, 650 Route des Lucioles, F-06921 Sophia Antipolis Cedex—France, Feb. 2015; 266 pages.
"ETSI TS 136 423 V12.4.2 (Feb. 2015) Technical Specification: LTE; Evolved Universal Terrestrial Radio Access Network (E-UTRAN); X2 Application Protocol (X2AP) (3GPP TS 36.423 version 12.4.2 Release 12);" ETSI, European Telecommunications Standards Institute 2012, 650 Route des Lucioles, F-06921 Sophia Antipolis Cedex—France, Feb. 2015; 205 pages.
"ETSI TS-136-423 V9.4.0 (Oct. 2010) Technical Specification: LTE; Evolved Universal Terrestrial Radio Access Network (E-UTRAN); X2 Application Protocol (X2AP) (3GPP TS 36.423 version 9.4.0 Release 9)," ETSI, European Telecommunications Standards Institute, 650 Route des Lucioles F-06921 Sophia Antipolis Cedex—France, Oct. 2010, Section 8.3.8.
"ETSI GS NFV 002 V1.1.1 (Oct. 2013) Group Specification: Network Functions Virtualisation (NFV); Architectural Framework," ETSI, European Telecommunications Standards Institute, 650 Route des Lucioles F-06921 Sophia Antipolis Cedex—France, Oct. 2013; 21 pages.
"3GPP LTE Packet Data Convergence Protocol (PDCP) Sub Layer," EventHelix.com Inc., first published on or about Jan. 1, 2010; 20 pages.
"3GPP TR23.705 V0.11.0 (May 2014) Technical Report: 3rd Generation Partnership Project; Technical Specification Group Services and System Aspects; Study on system enhancements for user plane congestion management (Release 13)," 3GPP, 650 Route des Lucioles, F-06921, Sophia Antipolis Cedex—France, May 2014, 64 pages.
"3GPP TR 36.814 V9.0.0 (Mar. 2010) Technical Report: 3rd Generation Partnership Project; Technical Specification Group Radio Access Network; Evolved Universal Terrestrial Radio Access (E-UTRA); Further advancements for E-UTRA physical layer aspects (Release 9);" 3rd Generation Partnership Project (3GPP), Mar. 2010.
"3GPP TR 23.852 (V12.0.0 (Sep. 2013) Technical Report: 3rd Generational Partnership Project; Technical Specification Group Services and System Aspects; Study on S2a Mobility based on GPRS Tunnelling Protocol (GTP) and Wireless Local Area Network (WLAN) access to the Enhanced Packet Core (EPC) network (SaMOG); Stage 2 (Release 12);" 3rd Generation Partnership Project (3GPP), Sep. 2013, 157 pages.
"3GPP TS 22.368 V13.0.0 (Jun. 2014) Technical Specification: 3rd Generation Partnership Project; Technical Specification Group Services and System Aspects; Service requirements for Machine-Type Communications (MTC); Stage 1 (Release 13)," 3rd Generation Partnership Project; Jun. 2014.
"3GPP T523.002 V12.5.0 (Jun. 2014) Technical Specification: 3rd Generation Partnership Project; Technical Specification Group Services and System Aspects; Network architecture (Release 12)," 3GPP, 650 Route des Lucioles, F-06921, Sophia Antipolis Cedex—France, Jun. 2014; See Sections 1-5, pp. 11-76.
"3GPP TS 23.060 V13.0.0 (Sep. 2014) Technical Specification: 3rd Generation Partnership Project; Technical Specification Group Services and System Aspects; General Packet Radio Service (GPRS); Service description; Stage 2 (Release 13)," [Relevant Sections 5.3.20 and 6.2.3 only]; 3rd Generation Partnership Project; Sep. 2014.
"3GPP TS 23.203 V13.1.0 (Sep. 2014) Technical Specification: 3rd Generation Partnership Project; Technical Specification Group Services and System Aspects; Policy and charging control architecture (Release 13)," [Relevant Sections 1-6 only]; 3rd Generation Partnership Project, Sep. 2014.
"3GPP TS 23.401 V13.3.0 (Jun. 2015) Technical Specification: 3rd Generation Partnership Project; Technical Specification Group Services and System Aspects;General Packet Radio Service (GPRS) enhancements for Evolved Universal Terrestrial Radio Access Network (E-UTRAN) access (Release 13)," 3rd Generation Partnership Project, 650 Route des Lucioles—Sophia Antipolis Valbonne—France, Jun. 2015; Sections 4 and 5 only.
"3GPP TS 23.682 V12.2.0 (Jun. 2014) Technical Specification: 3rd Generation Partnership Project; Technical Specification Group Services and System Aspects; Architecture enhancements to facilitate communications with packet data networks and applications (Release 12)," 3rd Generation Partnership Project; Jun. 2014.
"3GPP TS 23.887 V12.0.0 (Dec. 2013) Technical Report: 3rd Generation Partnership Project; Technical Specification Group Services and System Aspects; Study on Machine-Type Communications (MTC) and other mobile data applications communications enhancements (Release 12)," 3rd Generation Partnership Project; Dec. 2013.
Zyren, Jim, "Overview of the 3GPP Long Term Evolution Physical Layer," White Paper, Freescale Semiconductor, Document No. 3GPPEVOLUTIONWP; Jul. 2007; 27 pages.
"3GPP TS 29.212 V12.5.2 (Jul. 2014) Technical Specification: 3rd Generation Partnership Project; Technical Specification Group Core Network and Terminals; Policy and Charging Control (PCC); Reference Points (Release 12)," 3GPP, 650 Route des Lucioles, F-06921, Sophia Antipolis Cedex—France, Jul. 2014; Section 4, pp. 17-88.
"3GPP TS 29-272 V12-6-0 (Sep. 2014) Technical Specification: 3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release12)," [Relevant Sections 5 and 7.3.1-7.3.21 only]; 3rd Generation Partnership Project; Sep. 2014.
"3GPP TS 29-274 V12-6-0 (Sep. 2014) Technical Specification: 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12)," [Relevant Sections 4-6; 7.1-7.2.15; and 8.1-8.21.6 only]; 3rd Generation Partnership Project; Sep. 2014.
"3GPP TS 32.522 v11.2.0, 3rd Generation Partnership Project; Technical Specification Group Services and System Aspects; Telecommunication management; Self-Organizing Networks (SON) Policy Network Resource Model (NRM) Integration Reference Point (IRP); Information Service (IS) (Release 11)," 3GPP, 650 Route des Lucioles, F-06921 Sophia Antipolis Valbonne, France, Jun. 2012, 35 pages.
"3GPP TS 36.300 V12.3.0 (Sep. 2014) Technical Specification: 3rd Generation Partnership Project; Technical Specification Group Radio Access Network; Evolved Universal Terrestrial Radio Access (E-UTRA) and Evolved Universal Terrestrial Radio Access Network 9E-UTRAN); Overall description; Stage 2 (Release 12)," [Relevant Sections 15 and 23 only]; 3rd Generation Partnership Project; Sep. 2014.
"3GPP TS 36.300 V11.3.0 (Sep. 2012) Technical Specification: Group Radio Access Network; Evolved Universal Terrestrial Radio Access (E-UTRA) and Evolved Universal Terrestrial Radio Access Network (E-UTRAN); Overall Description; Stage 2 (Release 11)," 3rd Generation Partnership Project, Mobile Competence Centre; 650, Route Des Lucioles; F-06921 Sophia-Antipolis Cedex; France; Sep. 2012, 205 pages.
"3GPP TS 36.413 V9.5.1 (Jan. 2011)Technical Specification: 3rd Generation Partnership Project; Technical Specification Group Radio Access Network; Evolved Universal Terrestrial Radio Access Network (E-UTRAN); S1 Application Protocol (S1AP) (Release 9);" 3rd Generation Partnership Project, Jan. 2011.
"3GPP TS 36.413 V12.3.0 (Sep. 2014) Technical Specification: 3rd Generation Partnership Project; Technical Specification Group Radio Access Network; Evolved Universal Terrestrial Radio Access Network (E-UTRAN); S1 Application Protocol (S1AP) (Release 12)," [Relevant Sections 9.1.6 and 9.2.3.13 only]; 3rd Generation Partnership Project, Sep. 2014.
Xiong, Chao, "Enhanced ICIC for LTE-A HetNet," ZTE Corporation, LTE World Summit 2012, May 2012; 3 pages.
"3GPP TS 48.008 V8.8.0 (Dec. 2009) Technical Specification: 3rd Generation Partnership Project; Technical Specification Group GSM/EDGE Radio Access Network; Mobile Switching Centre—

(56) References Cited

OTHER PUBLICATIONS

Base Station System (MSC-BSS) interface; Layer 3 specification (Release 8);" 3rd Generation Partnership Project, Mobile Competence Centre; 650, Route Des Lucioles; F-06921 Sophia-Antipolis Cedex; France; Dec. 2009; 208 pages.
"3GPP TS 36.300 V9.7.0 (Mar. 2011) Technical Specification: $3^{rd}$ Generation Partnership Project; Technical Specification Group Radio Access Network; Evolved Universal Terrestrial Radio access (E-UTRA) and Evolved Universal Terrestrial Radio Access Network (E-UTRAN); Overall description; Stage 2 (Release 9)," 3GPP, 650 Route des Lucioles—Sophia Antipolis Valbonne—France, Mar. 2011; 173 pages.
3GPP Draft R1-124276, Research in Motion UK Limited, "Scoping the UMTS HetNet Study," 3rd Generation Partnership Project (3GPP), Mobile Competence Centre; 650; Route Des Lucioles; F-06921 Sophia-Antipolis; Sep. 2012; XP050662177.
3GPP Draft R3-071432, Telecom Italia, et al., "Self-optimization use case: self-tuning of cell reselction parameters for load balancing," 3rd Generation Partnership Project (3GPP), Mobile Competence Centre; 650; Route Des Lucioles; F-06921 Sophia-Antipolis; Aug. 2007; XP050162260.
3GPP TSG-RAN WG3 #61bis, R3-081174, "Solution for interference reduction SON use case," Orange, Alcatel-Lucent, Agenda Item 10.1.1c; Kansas City, MO, USA, May 5-9, 2008; 6 pages.
3GPP-TSG-RAN WG3 Meeting #60, R3-081123, "Dynamic Setup of HNBs for Energy Savings and Interference Reduction," Mitsubishi Electric, Agenda Item 10.1.1c; Kansas City, MO USA, May 5-9, 2008; 6 pages.
3GPP-TSG-RAN3 #59, R3-080082, "Capacity and Coverage SON Use Case," Alcatel-Lucent, Agenda Item 10.1.1.c; Sorrento, Italy, Feb. 11-15, 2008; 4 pages.
"4G++: Advanced Performance Boosting Techniques in 4th Generation Wireless Systems; A National Telecommunication Regulatory Authority Funded Project; Deliverable D4.1, Work Package 4, Inter-Cell Interference Coordination," 4G++ Project, Funded by the Egyptian National Telecommunications Regulatory Authority (NTRA); 75 pages First Published on or about Sep. 15, 2015.
Adrangi, F., et al., "Chargeable User Identity," Network Working Group RFC 4372, Jan. 2006, 10 pages.
Andrews, Matthew, et al., "Optimal Utility Based Multi-User Throughput Allocation Subject to Throughput Constraints," IEEE INFOCOM 2005, Mar. 13-17, 2005, Miami, FL; 10 pages.
Ashraf, Imran, "Distributed Radio Coverage Optimization in Enterprise Femtocell Networks," International Conference on Communications ICC 2010, May 23-27, 2010, Cape Town, South Africa; 6 pages.
Baid, Akash, et al., "Delay Estimation and Fast Iterative Scheduling Policies for LTE Uplink," HAL archives-ouvertes; HAL Id: hal-00763374, Submitted on Dec. 10, 2012; 9 pages https://hal.inria.fr/hal-00763374.
Basir, Adnan, "3GPP Long Term Evolution (LTE), ICIC and eICIC," posted Jun. 11, 2012; 5 pages; http://4g-lte-world-blogspot.com/2012/06/icic-and-eicic.html.
Bernardos, Carlos J., et al., "Challenges of Designing Jointly the Backhaul and Radio Access Network in a Cloud-based Mobile Network," Future Network & Mobile Summit 2013 Conference Proceedings, Jul. 2013; 10 pages.
"Bisection Method," Wikipedia, the free encyclopedia, Aug. 26, 2015; 5 pages.
"Block Error Ratio (BLER) Measurement Description," Keysight Technologies, Feb. 28, 2014; 3 pages http://rfmw.em.keysight.com/rfcomms/refdocs/wcdma/wcdma_meas_wblerror_desc.html.
"Broadband Forum Technical Report: TR-069 CPE WAN Management Protocol," Issue: 1, Amendment 4, Issue Date: Jul. 2011 Protocol Version 1.3; © The Broadband Forum; 190 pages.
"Broadband Forum Technical Report: TR-069 CPE WAN Management Protocol," Issue: 1, Amendment 5, Issue Date: Nov. 2013 CWMP Version 1.4; © The Broadband Forum; 228 pages.
"Broadband Forum Technical Report: TR-196 Frmto Access Point Service Data Model," Issue: 2, Issue Date: Nov. 2011; 46 pages.

Calhoun, P., "Diameter Base Protocol," Network Working Group RFC 3488, Sep. 2003; 147 pages.
"Cisco ASR 5000 Series Small Cell Gateway," Cisco White Paper, C11-711704-00, Jul. 2012, Cisco Systems, Inc., Printed in USA, © 2012 Cisco and/or its affiliates. All Rights Reserved. 6 pages.
"Cisco EnergyWise Management Suite—Data Sheet," Cisco Systems, Inc., C78-729774-00, Oct. 2013 © 2013 Cisco and/or its affiliates. All Rights Reserved. Printed in USA, 4 pages.
"Cisco Licensed Small Cell Solution: Reduce Costs, Improve Coverage and Capacity—Solution Overview," Cisco Systems, Inc., C22-726686-00, Feb. 2013, © 2013 Cisco and/or its affiliates. All Rights Reserved. Printed in USA, 13 pages.
"Cisco's One Platform Kit (onePK)," Networking Software (IOS & NX-OS), Cisco Systems, Inc., First published on or about Mar. 3, 2014; 2 pages.
Claussen, Holger, et al., "Self-optimization of Coverage for Femtocell Deployments," DOI 10:10.1109/WTS2008 Wireless Telecommunications Symposium, Apr. 26-28, 2008; Pomona, CA; 8 pages.
Do, Dr. Michelle M., et al., "Interference Coordination in LTE/LTE-A (2): eICIC (enhanced ICIC)," Netmanias Tech Blog, Aug. 6, 2014; 6 pages http://www.netmanias.com/en/post/blog/6551/lte-lte-a-eicic/interference-coordination-in-lte-lte-a-2-eicic-enhanced-icic.
Droms, R., "Dynamic Host Configuration Protocol," Network Working Group RFC 2131, Mar. 1997; 45 pages.
"E Band," from Wikipedia, the free encyclopedia, Dec. 24, 2013; 3 pages.
"EEM Configuration for Cisco Integrated Services Router Platforms," Configuration Guide for Cisco IOS® Embedded Event Manager (EEM), Cisco Systems, Inc., Feb. 2008; 17 pages.
"Extensible Authentication Protocol," Wikipedia, the free encyclopedia, 10 pages [Retrieved and printed Oct. 11, 2013] http://en.wikipedia.org/wiki/Extensible_Authentication_Protocol#EAP-FAST.
Ericsson, "R4-153549: Agenda Item 7.9.3.1—SFN and subframe offset reporting for dual connectivity," 3GPP TSG RAN WG4 Meeting #75, Fukuoka, Japan, May 25-29, 2015.
Ericsson, et al., "LPN Range Expansion in Co-Channel Deployment in Heterogeneous Networks," 3GPP Draft R1-125219 3rd Generation Partnership Project (3GPP), Mobile Competence Centre; 650; Route Des Lucioles; F-06921 Sophia-Antipolis; Nov. 2012, 7pages.
Ericsson, et al., "On the Feasibility of Operational Carrier Selection," 3GPP Draft R3-112991 , 3rd Generation Partnership Project (3GPP), Mobile Competence Centre; 650; Route Des Lucioles; F-06921 Sophia-Antipolis; Nov. 2011, 7 pages.
"Fading," from Wikipedia, the free encyclopedia, Apr. 10, 2015; 6 pages.
"Frame Structure—Downlink," Share Technote, first published on or about Jul. 9, 2012; 13 pages http://www.sharetechnote.com/html/FrameStructure_DL_html.
"Fuzzy Logic," from Wikipedia, the free encyclopedia, Dec. 3, 2015; 12 pages.
Freescale Semiconductor, "Long Term Evolution Protocol Overview," White Paper, Document No. LTEPTCLOVWWP, Oct. 2008; 21 pages.
Goldsmith, A.J., et al., "Variable Rate Variable-Power MQAM for Fading Channels," IEEE Trans. on Comm. vol. 45, No. 10, Oct. 1997.
"GSMA LTE Roaming Guidelines, Version 9.0," GSM Association, Official Document IR88, Jan. 24, 2013; 53 pages.
Guttman, E., et al., "Service Location Protocol, Version 2," Network Working Group RFC 2608, Jun. 1999, 57 pages.
Haverinen, H., "Extensible Authentication Protocol Method for Global System for Mobile Communications (GSM) Subscriber Identity Modules (EAP-SIM)," Network Working Group RFC 4186, Jan. 2006, 93 pages.
Holappa, Mikko, "Performance Comparison of LTE ENODEB OSI Layer 2 Implementations; Preemptive Partitioned Scheduling vs. Non-Preemptive Global Scheduling," Master's Thesis, Degree Programme in Information Networks; Oulun Yliopisto , University of OULU, Department of Computer Science and Engineering; Oct. 2013, 66 pages.

(56) References Cited

OTHER PUBLICATIONS

Holbrook, H., et al., "Source-Specific-Multicast for IP," Network Working Group RFC 4607, Aug. 2006.
Horn, Gavin, "3GPP Femtocells: Architecture and Protocols," Qualcomm Incorporated, 5775 Morehouse Drive, San Diego, CA, Sep. 2010; 64 pages.
"Hysteresis," from Wikipedia, the free encyclopedia; Oct. 1, 2015.
"Hybrid Automatic Repeat Request," from Wikipedia, the free encyclopedia, Jun. 8, 2015; 4 pages.
Ku, Gwanmo, "Resource Allocation in LTE," Adaptive Signal Processing and Information Theory Research Group, Nov. 11, 2011; 33 pages.
Kwan, R., et al., "A Survey of Scheduling and Interference Mitiation in LTE," vol. 2010, Article ID 273486, May 30, 2010.
Kwan, R., et al., "On Radio Admission Control for LTE Systems," Proc. of IEEE VTC-fail, Sep. 6-9, 2010.
Leung, K., et al., "WiMAX Forum/3GPP2 Proxy Mobile IPv4," Independent Submission RFC 5563, Feb. 2010; 41 pages.
Lopez-Perez, D., et al., "Interference Avoidance and Dynamic Frequency Planning for WiMAX Femtocells Networks," Proceedings of ICCS, Jun. 23-25, 2008.
LteWorld, "Packet Data Convergence Protocol (PDCP)," Information Page, LteWorld.org, published on or about Jan. 2, 2013; 2 pages.
"Link Layer Discovery Protocol," Wikipedia, the free encyclopedia, 4 pages, [Retrieved and printed Nov. 17, 2013] http://en.wikipedia.org/wiki/Link_Layer_Discovery_Protocol.
"LTE Physical Layer Overview," Keysight Technologies, First published on or about Aug. 24, 2014; 11 pages http://rfmw.em.keysight.com/wireless/helpfiles/89600B/webhelp/subsystems/lte/content/lte_overview.htm.
"LTE Frame and Subframe Structure," Cellular/Mobile Telecommunications, Tutorial, Radio-Electronics.com; first published on or abour Aug. 6, 2009 http://www.radio-electronics.com/info/cellulartelecomms/lte-long-term-evolution/lte-frame-subframe-structure.php.
"LTE Layers Data Flow," LTE Tutorial, tutorialspoint; first published on or about Jan. 17, 2013; 3 pages http://www.tutorialspoint.com/lte/lte_layers_data_flow.htm.
"LTE Protocol Stack Layers," LTE Tutorial, tutorialspoint; first published on or about Jan. 16, 2013 http://www.tutorialspoint.com/lte/lte_protocol_stack_layers.htm.
"LTE Quick Reference," from Share Technote; first published on or about Nov. 28, 2012; http://www.sharetechnote.com/html/Handbook_LTE_RNTI.html.
"LTE Quick Reference: CCE Index Calculation," LTE Handbook, Share Technote, first published on or about Jul. 8, 2012 http://www.sharetechnote.com/html/Handbook_LTE_CCE_Index.html.
"LTE Quick Reference: Resource Allocation and Management Unit," LTE Handbook, Share Technote, first published on or about Jul. 13, 2012 http://www.sharetechnote.com/html/Handbook_LTE_ResourceAllocation_ManagementUnit.html.
"LTE TDD Overview," from ShareTechnote; first published on or about Jul. 2, 2014 http://www.sharetechnote.com/html/LTE_TDD_Overview.html.
Mehlfuhrer, M., et al., "Simulating the Long Term Evolution Physical Layer," Proc. of 17th European Signal Processing Conference (EUSIPCO), Aug. 24-28, 2009.
Narten T., et al., "Neighbor Discovery for IP version 6 (IPv6)," Network Working Group RFC 4861, Sep. 2007; 97 pages.
NGMN Alliance, "Further Study on Critical C-RAN Technologies," Next Generation Mobile Networks, Mar. 31, 2015; 93 pages.
Nivaggioli, Patrice, "Cisco Small Cell Architecture," Cisco Connect, Dubrovnik, Croatia, South East Europe, May 20-22, 2013, © 2012 Cisco and/or its affiliates. All Rights Reserved.; 40 pages.
Nokia Corporation, et al., "SON WI Status Overview," 3GPP Draft R2-093231, 3rd Generation Partnership Project (3GPP), Mobile Competence Centre; 650; Route Des Lucioles; F-06921 Sophia-Antipolis; Apr. 2009.

Novlan, Thomas David, et al., "Analytical Evaluation of Fractional Frequency Reuse for OFDMA Cellular Networks," arXiv: 1101.5130v1 [cs.IT]; arXiv.org, Cornell University Library; Jan. 26, 2011, 25 pages.
Okubo, Naoto, et al., "Overview of LTE Radio Interface and Radio Network Architecture for High Speed, High Capacity and Low Latency," Special Articles on "Xi" (Crossy) LTE Services—Toward Smart Innovation—Technology Reports; NTT DOCOMO Technical Journal vol. 13 No. 1, Jun. 2011.
"Paging Channel Selection," UMTS World; first published on or about Jun. 22, 2003; 3 pages; http://www.umtsworld.com/technology/paging.html.
"Paging Indicator Channel PICH Work in 3G," Teletopix.org, Telecom Techniques Guide, Feb. 13, 2014, 2 pages http://www.teletopix.org/3g-wcdma/paging-indicator-channel-pich-work-in-3g/.
"PDCCH Construction, Expert Opinion," posted by Hongyan on May 20, 2011; LTE University, 4 pages http://lteuniversity.com/get_trained/expert_opinion1/b/hongyanlei/archive/2011/05/20/pdcch-construction.aspx.
"PDCCH Processing," published by Gio Zakradze on Dec. 29, 2014; 56 pages.
"Plane (in networking)," Definition from WhatIs.com; Jan. 2013 http://whatis.techtarget.com/definition/plane-in-networking.
Piro, G., et al., "An LTE module for the ns-3 Network Simulator," in Proc. of Wns3 2011 (in conjunction with SimuTOOLS 2011), Mar. 2011, Barcelona Spain.
Qualcomm Incorporation: "Design Objectives and Deployment Scenarios for Hetnets," 3GPP Draft R1-124528, 3rd Generation Partnership Project (3GPP), Mobile Competence Centre; 650; Route Des Lucioles; F-06921 Sophia-Antipolis; Sep. 2012, XP050662404.
"Quadrature amplitude modulation," from Wikipedia, the free encyclopedia, Apr. 22, 2015; 11 pages.
"QoS Class Identifier," from Wikipedia, the free encyclopedia, Oct. 7, 2015.
"Radius," Wikipedia, the free encyclopedia, 12 pages [Retrieved and printed Oct. 11, 2013] http://en.wikipedia.org/wiki/RADIUS.
"RSRP, EPRE, Total Power," LTE Quick Reference from Sharetechnote.com; first published on or about Aug. 3, 2014; http://www.sharetechnote.com/html/Handbook_LTE_RSRP_EPRE_TotalPower.html.
Saad, Sawsan A., et al., "A Survey on Power Control Techniques in Femtocell Networks," Journal of Communications vol. 8, No. 12, Dec. 2013; 10 pages.
Sadiq, Bilal, et al., "Throughput Optimality of Delay-driven Max Weight Scheduler for a Wireless System with Flow Dynamics," 47th Annual Allerton Conference, Sep. 30-Oct. 2, 2009, University of Illinois at Urbana-Champaign, Champaign, Illinois; 6 pages.
Salim, Umer, et al., "State-of-the-art of and promising candidates for PHY layer approaches on access and backhaul network," INFSO-ICT-317941 iJOIN D 2.1, iJOIN GA, Nov. 4, 2013; 129 pages.
Seo, H., et al., "A proportional-fair power allocation scheme for fair and efficient multiuser OFDM systems," in Proc. of IEEE GLOBECOM, Dec. 2004, Dallas (USA).
Stefan Schwarz Etal: "Low complexity approximate maximum throughput scheduling for LTE," 2010 44th Asilomar Conference on Signals, Systems and Computers, Nov. 7-10, 2010, XP031860825, DOI:10.1109/ACSSC.2010.5757800ISBN:978-1-4244-9722-5 p. 1563-p. 1565.
Stolyar A.L., et al., "Self-Organizing Dynamic Fractional Frequency Reuse for Best-Effort Traffic through Distributed Inter-Cell Coordination," IEEE INFOCOM 2009, Proceedings of 28th Conference on Computer Communications, Apr. 12, 2009, pp. 1287-1295, XP031468882, ISBN:978-1-4244-3512-8.
Tassiulas, L., et al., "Stability Properties of Constrained Queueing Systems and Scheduling Policies for Maximum Trhoughput in Multihop Radio Networks," Technical Research Report,CSHCN TR 92-3/ISR TR 92-129, Center for Satellite & Hybrid Communication Networks, A NASA Center for the Commercial Development of

(56) References Cited

OTHER PUBLICATIONS

Space; University of Maryland Institute for Systems Research; Published in IEEE Transactions on Automatic Control, vol. 37, No. 12, Dec. 1992; 14 pages.
"Transmission Time Interval," from Wikipedia, the free encyclopedia, May 2, 2013.
UKIPO Mar. 27, 2012 Search Report from GB Patent Application Serial No. GB1120462.5.
UKIPO Jan. 19, 2013 Search Report from GB Patent Application Serial No. GB1120462.5.
UKIPO Dec. 20, 2013 Search Report from GB Application Serial No. GB1312321.1, 6 pages.
Velasco, Julio C., et al., "MEF Microwave Technologies for Carrier Ethernet," Metro Ethernet Forum (MEF), 6033 W. Century Boulevard, Suite 1107, Los Angeles CA 90045 USA Jan. 2011; 23 pages.
Wanda, Alex, "UMTS UTRAN Block Error Rate (BLER) Measurements," Telecom Insights, Jan. 2011; 3 pages http://trends-in-telecoms.blogspot.com/2011/01/umts-utrans-block-error-rate-rate-bler.html.
Weaver, Carl, "Self-Organizing Mobility Robustness Optimization in LTE Networks with eICIC," Draft V5.0, Submitted Oct. 23, 2013, Cornell University Library, 19 pages http://arxiv.org/abs/1310.6173.
"Whats is Uplink RSSI in LTE," TelecomSource thread, May 22, 2013; 5 pages http://www.telecomsource.net/howthread.php?5464-Whats-is-Uplink-RSSI-in-LTE.
Wubben, Dirk, et al., "Benefits and Impact of Cloud Computing on 5G Signal Processing," IEEE Signal Processing Magazine, Nov. 2014.
EPO Jul. 29, 2014 Extended Search Report from European Application Serial No. EP13195673, 12 pages.
Nokia Siemens Networks et al: "Enhanced ICIC considerations for HetNet scenarios", 3GPP Draft; R1-103822_EICIC_OVERVIEW, 3rd Generation Partnership Project (3GPP), Mobile Competence Centre; 650, Route Des Lucioles; F-06921 Sophia-Antipolis Cedex; France, vol. RAN WG1, No. Dresden, Germany; Jun. 28, 2010-Jul. 2, 2010, Jun. 22, 2010 (Jun. 22, 2010), XP050598481, [retrieved on Jun. 22, 2010] Section 3, 4 pages.
EPO Nov. 19, 2015 Extended Search Report and Written Opinion from European Application EP13767700; 9 pages.
EPO Mar. 26, 2015 Extended Search Report and Opinion from European Application Serial No. EP14190541.
PCT Jul. 16, 2013 International Search Report and Written Opinion from International Application PCT/IL2013/050269, 3 pages.
PCT Oct. 1, 2014 International Preliminary Report on Patentability from International Application PCT/IL2013/050269, 4 pages.
PCT Mar. 17, 2014 International Search Report and Written Opinion from International Application Serial No. PCT/IL2013/000086, 12 pages.
Qualcomm Incorporated: "Introduction of enhanced ICIC", 3GPP Draft; R2-106246, 3rd Generation Partnership Project (3GPP), Mobile Competence Center; 650, Route Des Lucioles; F-06921 Sophia-Antipolis Cedex; France, vol. RAN WG2, No. Jacksonville, USA; Nov. 15, 2010, Nov. 9, 2010 (Nov. 9, 2010), XP050492195, [retrieved on Nov. 9, 2010] Section 16.X.2, 5 pages.
PCT—Feb. 13, 2013 International Search Report and Written Opinion from International Application PCT/GB2012/052511; 28 pages.
EPO Jan. 27, 2016 Extended Search Report and Written Opinion from European Application Serial No. 15183582.4; 6 pages.
Sabella, Dario, et al., "RAN as a Service: Challenges of Designing a Flexible RAN Architecture in a Cloud-based Heterogeneous Mobile Network," Future Network Summit Conference, Lisbon, Portugal, Jul. 3-5, 2013; 8 pages.
"ETSI TS 128 657 V11.0.0 (Feb. 2013) Technical Specification: Universal Mobile Telecommunications System 9UMTS); LTE; Telecommunication management; Evolved Universal Terrestrial Radio Access Network 9E-UTRAN) Network Resource Model (NRM); Integration Reference Point (IRP); Requirements (3GPP TS 28.657 version 11.0.0 Release 11)," ETSI, European Telecommunications Standards Institute 2012, 650 Route des Lucioles, F-06921 Sophia Antipolis Cedex—France, Feb. 2013; 9 pages.
"ETSI TS 128 658 V11.0.0 (Feb. 2013) Technical Specification: Universal Mobile Telecommunications System 9UMTS); LTE; Telecommunication management; Evolved Universal Terrestrial Radio Access Network (E-UTRAN) Network Resource Model (NRM) Integration Reference Point (IRP); Information Service (IS) (3GPP TS 28.658 version 11.0.0 Release 11)," ETSI, European Telecommunications Standards Institute 2012, 650 Route des Lucioles, F-06921 Sophia Antipolis Cedex—France, Feb. 2013; 53 pages.
"ETSI TS 128 659 V11.0.0 (Jan. 2013) Technical Specification: Universal Mobile Telecommunications Systems (UMTS); LTE; Telecommunications Management; Evolved Universal Terrestrial Radio Access Network (E-UTRAN) Network Resource Model (NRM) Integration Reference Point (IRP); Solution Set (SS) definitions (3GPP TS 28.659 version 11.0.0 Release 11)," ETSI, European Telecommunications Standards Institute 2012, 650 Route des Lucioles, F-06921 Sophia Antipolis Cedex—France, Jan. 2013; 48 pages.
"ETSI TS 136 300 V10.2.0 (Jan. 2011) Technical Specification: LTE; Evolved Universal Terrestrial Radio Access (E-UTRA) and Evolved Universal Terrestrial Radio Access Network (E-UTRAN); Overall description; Stage 2 (3GPP TS 36.300 version 10.2.0 Release 10)," ETSI, European Telecommunications Standards Institute 2012, 650 Route des Lucioles, F-06921 Sophia Antipolis Cedex—France, Jan. 2011; 208 pages.
"ETSI TS 136 423 V11.3.0 (Jan. 2013) Technical Specification: LTE; Evolved Universal Terrestrial Radio Access Network (E-UTRAN); X2 Application Protocol (X2AP) (3GPP TS 36.423 version 11.3.0 Release 11)," ETSI, European Telecommunications Standards Institute 2012, 650 Route des Lucioles, F-06921 Sophia Antipolis Cedex—France, Jan. 2013; 143 pages.
Chauhan, Himanshu, "UE Measurements and Reporting in UMTS," Wireless Technologies, Blog dated Apr. 26, 2013; 3 pages http://worldtechieumts.blogspot.com/2013/04/ue-measurements-and-reporting-in-umts.html.
Ghaffar, Rizwan, et al., "Fractional Frequency Reuse and Interference Suppression for OFDMA Networks," published in "WiOpt" 10: Modeling and Optimization in Mobile, Ad Hoc, and Wireless Networks (2010), Jul. 19, 2010, 5 pages.
La Rocca, Maurizio, "RSRP and RSRQ Measurement in LTE," laroccasolutions Technology & Services, Feb. 2, 2015; 9 pages http://www.laroccasolutions.com/training/78-rsrp-and-rsrq-measurement-in-lte.
Madan, Ritesh, et al., "Fast Algorithms for Resource Allocation in Wireless Cellular Networks," IEEE/ACM Transactions on Networking, vol. 18, No. 3, Jun. 2010; 12 pages.
Park, Jeongho, et al., "Interference Level Control in Mobile WiMAX Uplink System," 2009 IEEE Mobile WiMAX Symposium, Jul. 9-10, 2009; 5 pages.
"Received signal strength indication," Wikipedia, the free encyclopedia, Dec. 22, 2014; 2 pages.
Rengarajan, Balaji, "A Semi-autonomous Algorithm for Self-organizing Dynamic Fractional Frequency Reuse on the Uplink of OFDMA Systems," Dec. 14, 2009; 22 pages.
Ruby, Ruksana, et al., "Uplink Scheduling Solution for Enhancing Throughput and Fairness in Relayed Long-Term Evolution Networks," IET Communications 2014, vol. 8, Issue 6, Apr. 2014; 13 pages.
Tayal, Nitin, "All About PDCCH and CCE Allocation," Tayal's Way to Learn LTE, Tutorial Blog dated May 2013, 14 pages http://nitintayal-lte-tutorials.blogspot.com/2013/05/all-about-pdcch-and-cce-allocation.html.
Thapa, Chandra, et al., "Comparative Evaluation of Fractional Frequency Reuse (FFR) and Traditional Frequency Reuse in 3GPP-LTE Downlink," International Journal of Mobile Network Communications & Telematics (IJMNCT) vol. 2, No. 4, Aug. 2012; 8 pages.
Wang, Jiao, "Dynamic Centralized Interference Coordination in Femto Cell Network with QoS Provision," Latest Trends on Communications, Proceedings of the 18th International Conference on Communications (Part of CSCC '14), Jul. 17-21, 2014; 6 pages.

(56) References Cited

OTHER PUBLICATIONS

PCT Mar. 27, 2014 International Search Report and Written Opinion from International Application PCT/IL2013/000080, 10 pages.
PCT Apr. 28, 2015 International Preliminary Report on Patentability and Written Opinion from International Application PCT/IL2013/000080.
ILPO May 13, 2015 Search Report from Israel Application Serial No. IL222709 [Only partially translated].
U.S. Appl. No. 15/071,724, filed Mar. 16, 2016, entitled "Power Setting," Inventor: Pankaj Uplenchwar, et al.
U.S. Appl. No. 15,089,252, filed Apr. 1, 2016, entitled Method and System for Dynamic Allocation of Resources in a Cellular Network.
U.S. Appl. No. 14/479,343, filed Sep. 7, 2014, entitled "Operation of Base Station in a Celllular Communication Network," Inventor: Simon Burley.
U.S. Appl. No. 15/015,691, filed Feb. 4, 2016, entitled "System and Method for Optimizing Performance of a Communication Network," Inventor(s): Ziv Nuss, et al.
U.S. Appl. No. 14/818,084, filed Aug. 4, 2015 entitled "Resource Adaptation for Frequency Domain Downlink Inter-Cell Interference Coordination," Inventors: Ritesh K. Madan et al.
U.S. Appl. No. 14/848,026, filed Sep. 8, 2015 entitled "Serving Noise/Macro Interference Limited User Equipment for Downlink Inter-Cell Interference Coordination," Inventors: Ritesh K. Madan et al.
U.S. Appl. No. 14/811,580, filed Jul. 28, 2015 entitled "Determining Fractional Frequency Reuse Power Levels for Downlink Transmissions," Inventor: Ritesh K. Madan.
U.S. Appl. No. 14/816,957, filed Aug. 3, 2015 entitled "Selecting Cells for Downlink Inter-Cell Interference Coordination," Inventors: Rohit U. Nabar et al.
U.S. Appl. No. 14/816,990, filed Aug. 3, 2015 entitled "User Equipment Power Level Selection for Downlink Transmissions," Inventors: Vikram Chandrasekhar et al.
U.S. Appl. No. 14/679,868, filed Apr. 6, 2015, entitled "System and Method for Managing Interference in a Network Environment Based on User Presence," Inventors: Mark Grayson, et al.
U.S. Appl. No. 14/687,198, filed Apr. 15, 2015, entitled "System and Method for Managing Interference in a Network Environment Based on User Presence," Inventors: Mark Grayson, et al.
U.S. Appl. No. 14/686,598, filed Apr. 14, 2015, entitled "System and Method for Providing Uplink Inter Cell Interference Coordination in a Network Environment," Inventors: Ritesh K. Madan, et al.
U.S. Appl. No. 14/691,260, filed Apr. 20, 2015, entitled "System and Method for Providing Uplink Inter Cell Interference Coordination in a Network Environment," Inventors: Ritesh K. Madan, et al.
U.S. Appl. No. 14/809,201, filed Jul. 25, 2015, entitled "System and Method to Facilitate Small Cell Uplink Power Control in a Network Environment," Inventors: Ritesh K. Madan, et al.
U.S. Appl. No. 14/833,519, filed Aug. 24, 2015, entitled "System and Method to Facilitate Small Cell Uplink Powercontrol in a Network Environment," Inventors: Ritesh K. Madan, et al.
U.S. Appl. No. 14/918,420, filed Oct. 20, 2015, entitled "System and Method for Frequency and Time Domain Downlink Inter-Cell Interference Coordination," Inventors: Ritesh K. Madan, et al.
U.S. Appl. No. 14/951,987, filed Nov. 25, 2015, entitled "System and Method for Frequency and Time Domain Downlink Inter-Cell Interference Coordination," Inventors: Ritesh K. Madan, et al.
U.S. Appl. No. 14/852,210, filed Sep. 11, 2015, entitled "System and Method for Providing Dynamic Radio Access Network Orchestration," Inventors: Virginia Rosa de Sousa Teixeira, et al.
U.S. Appl. No. 14/961,552, filed Dec. 7, 2015, entitled "System and Method to Provide Uplink Interference Coordination in a Network Environment," Inventor: Ritesh K. Madan.

U.S. Appl. No. 14/993,859, filed Jan. 12, 2016, entitled "System and Method to Facilitate Centralized Radio Resource Management in a Split Radio Access Network Environment," Inventor: Ritesh K. Madan.
U.S. Appl. No. 15/002,187, filed Jan. 20, 2016, entitled "System and Method to Provide Small Cell Power Control and Load Balancing for High Mobility User Equipment in a Network Environment," Inventor: Ritesh K. Madan.
U.S. Appl. No. 15/013,844, filed Feb. 2, 2016, entitled "System and Method to Facilitate Subframe Scheduling in a Split Medium Access Control Radio Access Network Environment," Inventor: Ian Neville Bendle, et al.
U.S. Appl. No. 15/018,677, filed Feb. 8, 2016, entitled "Mitigation of Uplink Interference Within Heterogeneous Wireless Communications Networks," Inventor: Pankaj Uplenchwar, et al.
PCT Jun. 16, 2014 International Search Report and Written Opinion of the International Searching Authority for International Application Serial No. PCT/IL2013/000085.
"3GPP TS 25.367 V11.0.0 (Jun. 2012) Technical Specification: Group Radio Access Network; Mobility procedures for Home Node B (HNG); Overall description; Stage 2 (Release 11)," 3rd Generation Partnership Project, Mobile Competence Centre; 650, Route Des Lucioles; F-06921 Sophia-Antipolis Cedex; France; Jun. 2012, 14 pages.
"3GPP TS 36.300 V11.3.0 (Sep. 2012) Technical Specification: Group Radio Access Network; Evolved Universal Terrestrial Radio Access (E-UTRA) and Evolved Universal Terrestrial Radio Access Network (E-UTRAN); Overall Description; Stage 2 (Release 11)," $3^{rd}$ Generation Partnership Project, Mobile Competence Centre; 650, Route Des Lucioles; F-06921 Sophia-Antipolis Cedex; France; Sep. 2012, 205 pages.
"3GPP TS 37.320 V11.1.0 (Sep. 2012) Technical Specification: Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 11)," $3^{rd}$ Generation Partnership Project, Mobile Competence Centre; 650, Route Des Lucioles; F-06921 Sophia-Antipolis Cedex; France; Sep. 2012, 21 pages.
"3GPP Draft TR_R3018_V_100 (Oct. 2007) Technical Specification: Group Radio Access Network; Evolved UTRA and UTRAN; Radio Access Architecture and Interfaces (Release 7)," $3^{rd}$ Generation Partnership Project, Mobile Competence Centre; 650, Route Des Lucioles; F-06921 Sophia-Antipolis Cedex; France; Oct. 2007, XP050423659.
EPO Aug. 12, 2014 Extended EPO Search Report and Opinion from European Application Serial No. 13195780.8.
EPO Nov. 21, 2016 Extended Search Report and Written Opinion from European Application Serial No. 16180195.6; 9 pages.
Liu, Jianquo, et al., "Uplink Power Control and Interference Foordination for Heterogeneous Network," 2012 IEEE 23rd International Symposium on Personal, Indoor and mobile Radio Commmunications, Sydney, Australia, Sep. 9-12, 2012; 5 pages.
U.S. Appl. No. 15/374,903, filed Dec. 9, 2016, entitled "Power Management in a Cellular System," Inventors: Alan James Auchmuty Carter, et al.
U.S. Appl. No. 15/251,471, filed Aug. 30, 2016, entitled "Method and Apparatus for Reducing Inter-Cell Interference," Inventor: Ziv Nuss, et al.
IPO Mar. 27, 2017 Intellectual Property Office Combined Search and Examination Report under Sections 17 and 18(3) from Application No. GB1703805.0; 5 pages.
PRC Apr. 7, 2017 SIPO First Office Action from Chinese Application No. 201280058324.X; 14 pages (English translation only).

\* cited by examiner

METHOD FOR MANAGING HETEROGENEOUS CELLULAR NETWORKS

RELATED APPLICATION

This application is a divisional (and claims the benefit under 35 U.S.C. §120) of U.S. application Ser. No. 13/693,434, filed Dec. 4, 2012, entitled "METHOD FOR MANAGING HETEROGENEOUS CELLULAR NETWORKS," Inventors Ziv Nuss, et al. The disclosure of the prior application is considered part of (and is incorporated by reference in) the disclosure of this application in its entirety.

TECHNICAL FIELD

The invention relates to a system and a method for managing wireless networks, and in particularly to management of heterogeneous cellular networks.

BACKGROUND

In current cellular mobile broadband systems the achievable data rates are strongly dependent on the users' positions in the network.

In order for wireless networks operators to solve one of their biggest problems—how to get more signal strength where one needs or wants it most, the operators have started in the recent years to deploy their own or rely on end users to buy very small Base Stations, in order to meet the increasing demand for data traffic. This new type of cell sites, referred to hereinbelow as "small cells" or "metro cells", used in conjunction with wireless cells of the traditional cellular networks (macro cells). Networks that include both macro cells and metrocells are referred to herein as heterogeneous networks (HetNets).

The term "small cells" as used herein and throughout the specification and claims encompass femtocells, picocells microcells and metrocells. Small-cell networks can also be realized by means of distributed radio technology consisting of centralized baseband units and remote radio heads. Beamforming technology (focusing a radio signal on a very specific area) can be utilized to further enhance or focus small cell coverage. A common factor in all these approaches to small cells is that they are centrally managed by mobile network operators.

Small cells provide a small radio footprint, which can range from 10 meters within urban and in-building locations to 2 km for a rural location.

According to the solution being adopted by the operators, the end-users may buy small devices that are personal cellular base stations. The device typically has an antenna to boost the available signal as well as an Internet connection. The device uses the end user Internet connection to connect to the service provider's network and to route the user's phone calls.

As will be appreciated by those skilled in the art, scenarios that entail an overlapping deployment, while using the same or adjacent frequency channels, between two (or more) cells of the same or different types (e.g. macro, metro etc.) are possible.

The problem yet to be solved is how to enable efficient simultaneous operation of both macro cells and small cells where the latter are located within area covered by the macro cell, while providing the same user experience across the whole cellular network (or even better) in order to satisfy the users' expectations, and at the same time, while the macro cell can be unaware of small cells being operative within its range.

One of the problems associated with such a deployment is that along with the expected densification of small cells' deployments, there is a rapid increase in the number of physical layer identifiers ("PLI's) that are used in modern cellular technologies to identify the Base Station for mobile terminals. Examples of such identifiers are PCI in LTE compatible systems and primary scrambling codes ("PSC"s) in UMTS compatible networks, or any other applicable physical layer identifiers in systems that are compatible with other International Standards. However, as the number of possible PLIs is limited, the probability of having PLI collision within the small cell grid, as well as between the small cells and the macro network, increases significantly. A large number of small cells effectively preclude the network operator from being able to manually assign PLIs to the various small cells. Therefore, the present invention seeks to provide a solution by which the PLIs may be allocated automatically and reassessed periodically in order to avoid PLI collisions at times when changes in network conditions occur.

SUMMARY OF THE DISCLOSURE

The disclosure may be summarized by referring to the appended claims.

It is an object of the present invention to provide a method and apparatus to enable automatic and/or dynamic mass deployment of small cells.

It is another object of the present invention to provide a method and apparatus to enable dynamic management of neighbor lists in macro cells that play essential role in reselection of the small cells by UEs connected to or camping on the macro cells.

It is still another object of the present invention to provide a method and apparatus to enable hand-in from the macro cells to the small cell grid via grid gateway cells, by creating non-ambiguous neighbor relations to the grid gateway cells.

It is yet another object of the present invention to provide a method and apparatus to enable optimizing hand-out process from the small cells to the macro network by automatic tuning of neighbor lists in the small cells based on macro network visibility.

It is still another object of the present invention to provide a method and apparatus to enable dynamically managing the PLI allocation across the small cells and the macro cells.

It is yet another object of the present invention to provide a method and an apparatus to enable mass deployment of small cells while providing them with an optimal PLI list, to be used by each of the small cells. For example, by allocating a list of PLIs to be used by a grid of small cells, say, a list of 5 for 20 cells, while each gateway cell gets a single individual PLI assigned thereto.

Other objects of the present invention will become apparent from the following description.

According to a first embodiment there is provided a method for managing a heterogeneous cellular network ("HetNet") comprising one or more macro cells and a first plurality of small cells, wherein the method comprises the steps of:

providing a second plurality of small cells belonging to the first plurality of small cells;

obtaining information that pertains to geographical relationship between at least one of the one or more macro cells and the second plurality of small cells;

based on the information obtained, identifying at least one macro cell from among the one or more macro cells, located at a geographical vicinity of at least one of the second plurality of small cells, preferably, at a geographical vicinity of at least most of the second plurality of small cells;

selecting at least one small cell from among said second plurality of small cells to be a gateway cell, and selecting at least one other small cell of the second plurality of small cells to be an inner cell, and wherein the selection of the at least one cell as a gateway cell is based upon reception intensity at which communication signals transmitted by a base station located at the at least one macro cell identified, are received;

identifying physical layer identifiers ("PLI"s) assigned to the at least one macro cell identified;

for a frequency carrier at which the gateway cell is operative, determining one or more PLIs available for use by the gateway cell, wherein the one or more available PLIs are not currently used by the base station of the at least one macro cell at that frequency carrier;

determining one or more PLIs available for use by the at least one inner small cell; and selecting for each of the at least one gateway cell and for each of the at least one inner cell, a PLI for communications, wherein each PLI is selected from among the one or more PLIs available for use by the respective small cell.

The term "gateway (small) cell" or "grid gateway" is used herein to denote a device that routes communications (e.g. packets) both directions from a cellular network to a local network (e.g. a grid) of small cells. Preferably, the gateway cell has all the functionalities of any other cell in the small cells' network, and it is determined to be the gateway cell for the small cells' network based on its geographical proximity to a macro cell of the cellular network. In some embodiments of the present invention, the gateway cell may be used to enable handover of a UE from a macro cell to one of the other small cells belonging to the small cells' network.

According to another embodiment, the information that pertains to geographical relationship comprises measurement reports of wireless entities currently operative at the vicinity of the second plurality of small cells, wherein the measurement reports comprise information that relates to an intensity at which communication signals are received by each respective one of the receiving wireless entities, and/or the information is configuration information that relates to the one or more macro cells and their respective locations and to the small cells and their respective locations.

By yet another embodiment, the at least one small cell selected as a gateway cell, is a small cell having equal or higher reception intensity of communications signals transmitted by a base station located at the at least one macro cell identified, than any of the other small cells included in the second plurality of small cells, wherein the reception is done by mobile devices reporting the measurement reports (which are either at the vicinity of the gateway small cell or at the vicinity of the inner-grid small cells) and/or by the small cell itself when operating in a self measuring mode (i.e. while being at its "Network listen" mode).

According to another embodiment, the gateway cell is further operative to enable handover of UEs from the at least one macro cell identified, to at least one other of the second plurality of the small cells. In other words, the gateway cell is used in the HO ("hand-in") as an entry point from a macro cell to the grid comprising the second plurality of small cells.

In accordance with another embodiment, the list of one or more PLIs available for use by the gateway cell, is composed so that all PLIs included in the list are not currently used by the base station of the at least one macro cell, and by base stations of all neighbor macro cells (i.e. these PLIs are not used at any of the macro cells in the area).

By another embodiment, the step of selecting PLIs to be used in each of the small cells belonging to the second plurality of small cells, further comprises taking into account currently used (configured) PLIs in the one or more macro cells. This information may be retrieved for example by retrieving cell configuration of the at least one identified macro cell from a management system operative to manage the one or more macro cells.

In accordance with another embodiment, managing the activities comprised in steps of the method provided by the present invention is carried out by a single managing entity (e.g. a centralized self organizing network, "cSON", entity) which is connected to a management system of the one or more macro cells and to a management system of the first plurality of small cells, thereby enabling that single managing entity (e.g. the cSON) to retrieve and provide information in a synchronized manner from/to both management systems.

According to yet another embodiment, the method further comprising a step of determining the neighboring relationship between small cells belonging to the second plurality of small cells, based on the measurement reports received.

By yet another embodiment, the method further comprising a step of establishing a neighbors' list defining the geographical relationship existing between small cells belonging to the second plurality of small cells themselves, and between small cells belonging to the second plurality of small cells and the at least one macro cell.

In accordance with another embodiment, the measurement reports comprise information that relates to intensity at which communications transmitted from one or more base stations serving respective macro cells are received by a respective UE, and/or to intensity at which communications transmitted from one or more base stations serving respective small cells are received by the various UEs, and/or to intensity at which communications transmitted from a base station serving a macro cell are received at small cells belonging to the second plurality of small cells.

As will be appreciated by those skilled in the art, each UE may perform measurements and generate a measurement report that relates to signals from: one or more base stations of the macro cells, one or more base stations of the small cells or any combination thereof.

According to still another embodiment, the measurement reports comprise information that relates to intensity at which communications transmitted from one or more base stations serving respective macro cells are received at one or more of the second plurality of small cells. Preferably, according to this embodiment, the information is used for estimating the path loss between the (receiving) small cell and the (transmitting) macro cell, thereby enabling to estimate which small cell is close to which macro cell.

By yet another embodiment, the measurement reports are forwarded and stored at the network radio controller (RNC). The measurement reports are forwarded via the base station (of a macro cell or of a small cell) to which the UE is connected at the time of reporting. This information may then be used as explained hereinabove, to estimate which small cell is close to which macro cell.

According to another embodiment, the one or more PLIs available for use by the first small cell, are determined from among one or more PLIs that are not currently used by the base station of the at least one macro cell identified, and not by a base station of any of the neighboring macro cells of the identified macro cell.

By yet another embodiment, the at least one cell selected as a gateway cell is selected based on the intensity at which communications signals are received thereat and based on history data of successful hand-outs from the local network of the small cells (e.g. the grid) to the respective macro cell.

In accordance with still another embodiment, in case of adding a third small cell as an inner grid small cell belonging in that grid, the method further comprises the steps of:

detecting the third small cell (e.g. after it has been deployed and/or after it has been activated) and retrieving location information associated therewith;

identifying one or more physical layer identifiers (PLIs) that are not currently used by any of the small cells belonging to the grid to which the third small cell is being added;

configuring the third small cell with a unique PLI from among the one or more physical layer identifiers (PLIs) that are not currently used by any of the small cells belonging to the grid.

By yet another embodiment, the method further comprising creating a neighbor relations' list for each grid gateway cell associated with the selected macro cell, wherein that list comprises the allocated PLI and the Cell ID (which is a unique ID in the operator's network) or Cell Global ID (which is a globally unique ID) of the grid gateway cells.

According to another embodiment, the neighbor relations' list further comprising inner grid small cells and their association with their respective grid gateway cell.

In accordance with still another embodiment, the method further comprising a step of deleting entries in the neighbor relations' list which are the least used neighbors included in the neighbors' list of the selected macro sell, where the least used neighbors included in the neighbors' list, may be determined for example based on pre-defined threshold.

According to another embodiment, the neighbor relations' list is dynamically updated to include only small cells which are currently active.

In accordance with another aspect, there is provided a method for managing a heterogeneous cellular network comprising at least one macro cell and a plurality of small cells, comprising the steps of:

defining a geographical area and identifying all macro cells included within the defined area;

obtaining measurement reports of wireless entities currently operative within the defined area, wherein the measurement reports comprise information that relates to an intensity at which communication signals are received by each respective one of the receiving wireless entities;

based on the measurement reports obtained, establishing one or more neighbors' relations lists for groups of small cells located within all macro cells included in the defined area, by using a single cell identifier (or, cell ID) for small cells that belong to the group.

According to another embodiment of this aspect, the method further comprises a step of dynamically updating the one or more neighbors' relations lists established, in response to a change detected in future measurement reports.

In accordance with another embodiment, the measurement reports are reports are obtained every pre-defined period of time. In addition or in the alternative, the method is carried out essentially on a continuous basis, and in addition there are certain pre-defined events that when they occur, they will trigger re-assignment of PLIs. Such events may be for example activation of new macro cell, change in frequency or power settings of macro or small cell, etc.

Other aspects of the present invention such as certain features of a communication system, which is adapted to operate in accordance with the principles of the method described hereinabove, mutatis mutandis, are encompassed within the scope of the present invention.

BRIEF DESCRIPTION OF THE DRAWINGS

For a more complete understanding of the present invention, reference is now made to the following detailed description taken in conjunction with the accompanying drawings wherein.

DETAILED DESCRIPTION

Figure 1:
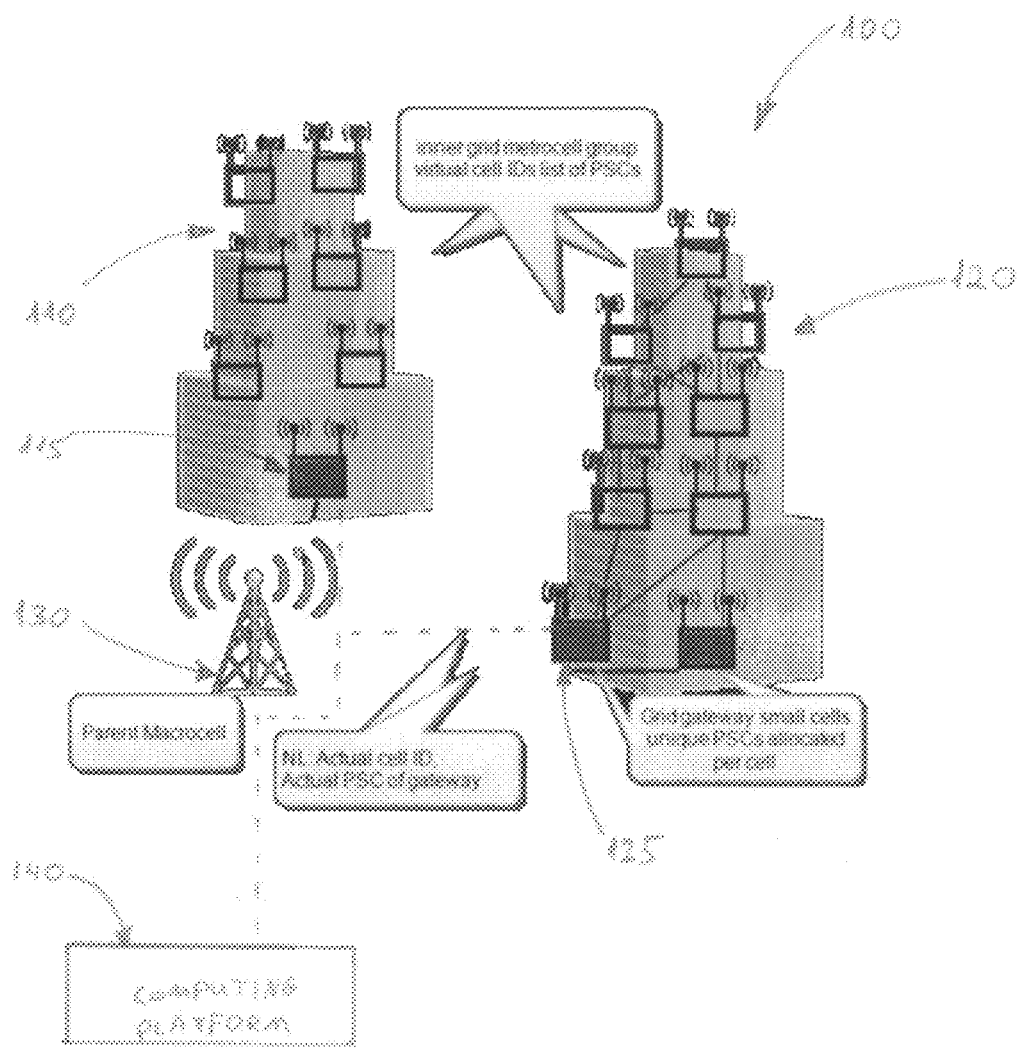
FIG. 1—is a schematic block diagram example of a system that comprises two small cell grids operative within the coverage area of a macro cell.

In this disclosure, the term "comprising" is intended to have an open-ended meaning so that when a first element is stated as comprising a second element, the first element may also include one or more other elements that are not necessarily identified or described herein, or recited in the claims.

In the following description, for the purposes of explanation, numerous specific details are set forth in order to provide a better understanding of the present invention by way of examples. It should be apparent, however, that the present invention may be practiced without these specific details.

A radio access network ("RAN") is part of a cellular telecommunication system. It resides between devices such as mobile phones, computers etc. and provides connection with its core network ("CN"). Typically it comprises a plurality of macro wireless cells serviced by their respective base stations and a management system that takes care after the proper function of the network (e.g. assignment of radio channels, transmission power, parameters affecting cell reselection, handovers, etc.).

However, as previously explained, network operators have started in the recent years to form small cells by installing metro/micro/pico devices in public places and Femto devices that are used as personal cellular sites. These devices typically have an antenna as well as an Internet connection. The Femto devices may use the end user Internet connection to connect to the service provider's network and to route the user's phone calls.

With mass market deployment of small cells, the number of cells, as well as density of cells will increase significantly, with each cell covering a much smaller area. Therefore, more neighbors' management is required with neighbors' lists to be negotiated and managed across the small cells as well as the macro network (i.e. the het net).

Having the proper neighbors' relations from the macro cells to the small cells is critical for both efficient utilization of the small cell layer as well as for improving the mobility robustness in the het net. Updated neighbors lists are required in the macro network for both idle mode reselection and active handover to enable hand-in from the macro network to the small cells via gateway cells (such as a small cell located in a building entrance, as opposed to cells located at higher floors). Another aspect which relates to the management of heterogenic networks is associated with creating neighbors relations between the macro network and a group of cells, in order to enable a high PLIs reuse. The method practiced in macro network of creating one-to-one relations will not be feasible in this situation, as one would require identifying and allocating free PLIs that can be used by the increasing number of small cells being deployed within a given area, without causing scrambling code collisions.

In order to address these problems, the solution provided by the present invention may be used to provide automatic detection of new small cells being deployed, and a way to associate these small cells to a "reference cluster" of macro cells.

Let us first consider FIG. 1, which illustrates a schematic block diagram example of system 100 that comprises two small cell grids 110 and 120, each located at a different house, wherein these two grids are operative within the coverage area of a macro cell being serviced by base station 130.

The small cells included in each of the two small cell grids, namely 110 and 120, is classified into grid gateway cells, 115 and 125 in the present example, which are operative to interact with their respective macro cell, and inner grid small cells which do not—e.g. indoor cells. Grid gateway cells are identical to other small cells, but are generally placed at a location that allows handover ("hand in") from the macro cell to the small cell grid. For example, for indoor deployment, the grid gateway cells will be typically located in the building entrance, while the small cells located on higher floors of the building will be inner grid cells and will not be target for hand-in from the macro. For outdoor deployment the grid gateway cells may be the cells along the road to a neighborhood not covered by the macro network.

In order for these small cells to properly operate, there is a need to dynamically allocate/assign a suitable PLIs to the various inner grid small cells, while ensuring that these codes to not collide with those of the macro cells operating at a distance short enough to induce interferences to their operation, when the same PLI is used by the macro cell. These PLIs are selected preferably from a list comprising available PLIs; the list may include less PLIs than the number of small cells. In addition, individual unique PLIs are selected for grid gateway cells, in order to enable hand-in of a mobile terminal moving from the macro cell network to the small cell grid network.

Thus, a computing platform 140 which comprises a processor is used to optimize assignment of scrambling codes to each of the various small cells. The computing platform is operative to check for new small cells being deployed and to synchronize their operation with the small cells Operation Support System ("OSS"). The computing platform is preferably operative to enable dynamic (ongoing) optimization of the PLIs being allocated to the small cells (also known as metro cells) to prevent collision and/or confusion between PLIs assigned to macro cells and to small cells.

First, the computing platform classifies small cells that are associated (e.g. located at the vicinity of) with macro cells as being gateway cells, which, as explained above will be used for the "hand in" process—handing the call over from the macro network to the metro (small) cell grid, whereas other small cells will be classified as inner grid cells.

Figure 2:
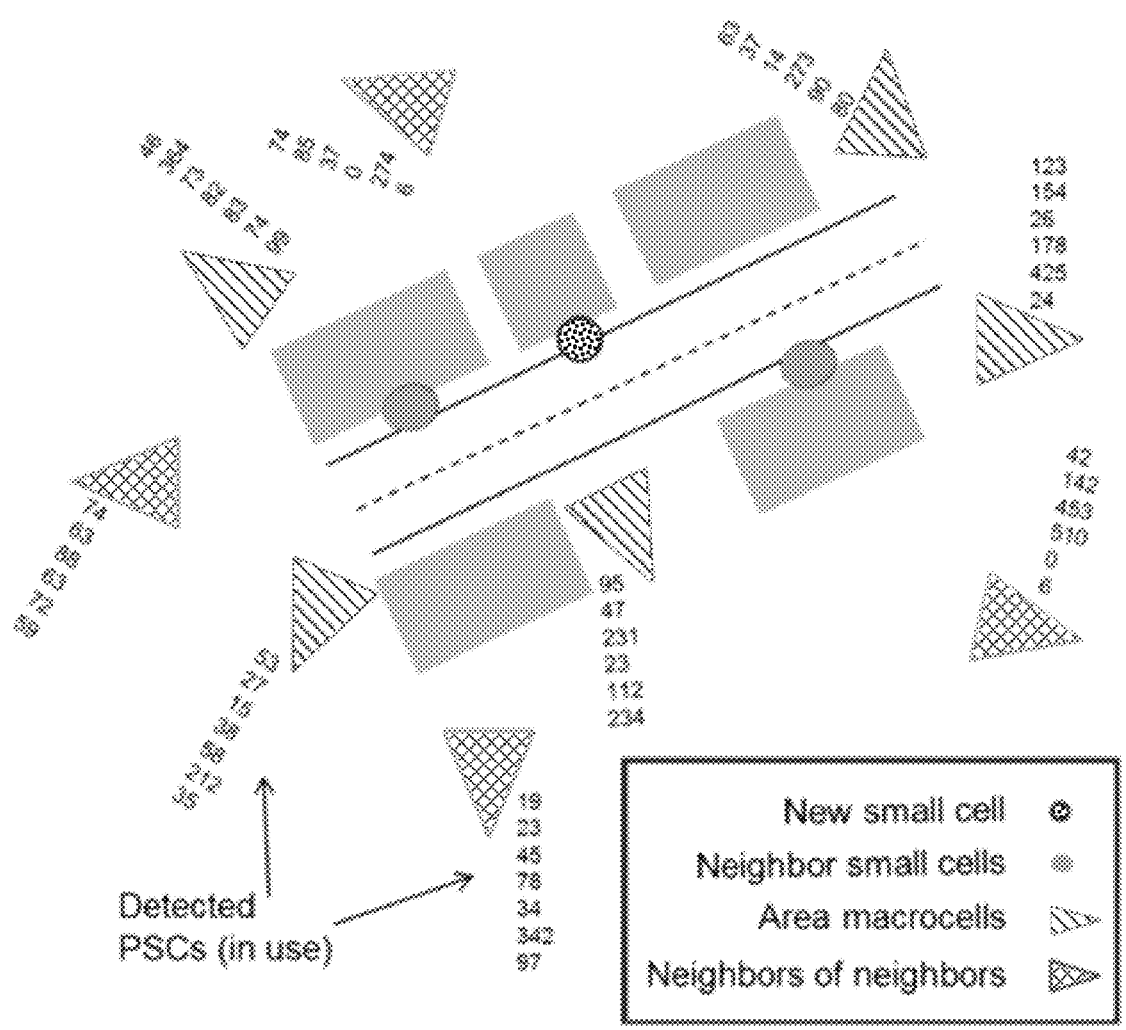
FIG. 2—illustrates a method for applying measurements from UE's linked to macro cells in order to identify additional PLIs that are available for use.

Then, the computing platform detects free (available) PLIs that can be used by the small cells, by checking the scrambling codes allocated to the macro cells in a cluster, one which preferably includes neighboring cells, and neighbors of the neighboring cells. In addition, the computing platform (which may be implemented for example as an application) applies measurements from user equipments ("UE's") that are linked to cells of the macro reference cluster, in order to identify additional PLIs that are available for use within that area as demonstrated in FIG. 2.

Preferably, no use should be made in inner cells of a) any PLI allocated to any of the surrounding macro cells, and b) of any PLI allocated to the relevant gateway cell(s). Preferably, one PLI may be used by more than one inner small cell ("PLI reuse").

The actual list of PLIs may be based on a configurable operator policy by which the acceptable RF thresholds in the area are determined. An example for such determination is illustrated in the following Table 1:

TABLE 1

| PSC ID | Number of missing neighbor events | Average RSCP | Average Ec/No |
|---|---|---|---|
| 121 | 0 | 0 | 0 |
| 28 | 0 | 0 | 0 |
| 54 | 0 | 0 | 0 |
| 83 | 10 | −104 dBm | −18 dBm |
| 65 | 45 | −101 dBm | −16 dBm |
| 48 | 68 | −102 dBm | −17 dBm |
| 74 | 71 | −102 dBm | −16 dBm |
| 341 | 87 | −101 dBm | −17 dBm |

According to the example presented in this table, PSCs 121, 28 and 54 are free, as no UE reports them as missing neighbors. PSCs 83, 65, 48, 74 and 341 have been reported by some UEs in the area as being missing neighbors, but they were received at average RSCP and Ec/No levels which are low enough (according to thresholds defined by the operator) so that they can be allocated for use by small cells.

Such configurable thresholds allow finding free PSCs that may be assigned for small cells. For example, when the small cells are deployed indoors, these thresholds can be set to take into account also the outdoor-to-indoor penetration loss, thereby enabling the use of a PSC that otherwise would not have been used due to its potential interference.

Figure 3:
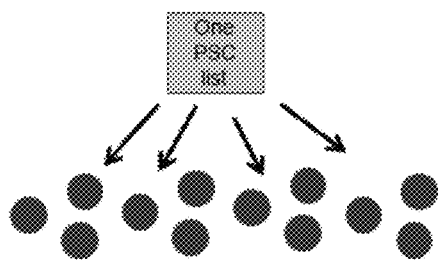
FIG. 3—exemplifies a prior art solution which is based on setting a single "static" PLI list for all small cells to be found in the HetNet.

The computational platform allocates an optimal PSC list for the inner grid small cells, say a list of up to 16 PSCs (the number is configurable, according to the capability of the small cell), out of which each small cell will automatically select an available PSC based on its network scan. This allows for automatic self-organization of the small cells in a "grid", where each small cell senses its neighboring small cells during the scan, and selects a PSC (out of the list) which is not currently in use within its own area. The allocation of additional PSCs reduce the chance for PSC collision within the small cells' grid, as opposed to prior art solutions, which set a single static PSC list (e.g. through the configuration profile) for all small cells to be found in the HetNet, as illustrated in FIG. 3. Since typically it is not possible to "carve out" many PSCs for small cell use within the entire network, this list would have fewer PSCs resulting in higher probability of PSC collision within the grid and consequently would lead to reduced grid performance.

Figure 4:
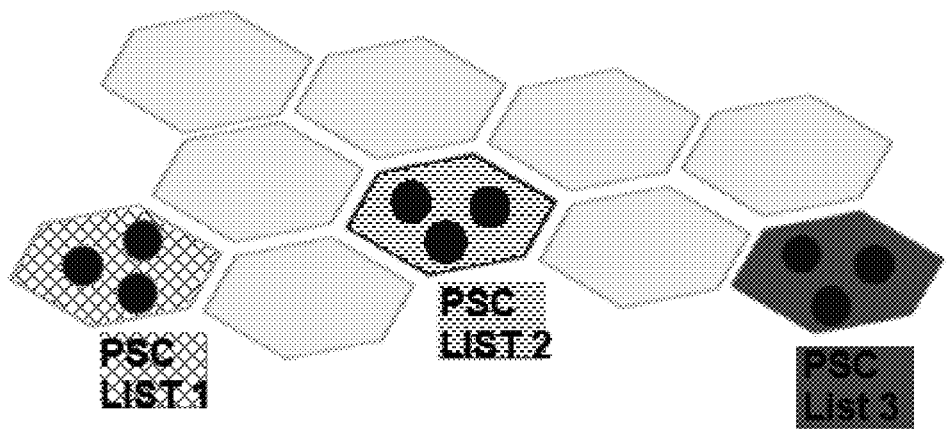
FIG. 4—exemplifies an embodiment of the method provided by the present invention for automatically creating an optimal PLI list per a given area.

The solution provided by the present invention as demonstrated in FIG. 4 allows for automatic creation of an optimal PLI list per a given area (e.g. to be based on macro "parent" cell resolution, rather than on the entire network). Therefore, it is possible to find and assign more PLIs for the small cells, while reducing the risk for PLI collision, thereby enhancing the grid performance.

Preferably, in order to allocate non-ambiguous PLIs for grid gateway cells, the computational platform disables the PLI selection mechanism of the small cells and allocates for each of the small cell an individual unambiguous PLI, out of PLIs detected as being unused PLIs. Once such a PCS is assigned to a grid gateway cell, it may be used thereafter for hand-in procedure, when a UE moves from the macro network to the small cell grid network.

Preferably, the computational platform continuously checks for actual and potential scrambling code collisions by monitoring the scrambling codes of the cells in the extended reference cluster defined above (e.g. the neighboring macro cells, and their neighboring macro cells), and by analyzing dropped calls. In cases of collisions, the computational platform may recalculate and reassign the required PLIs for the small cells located in the area of reference.

Figure 5:
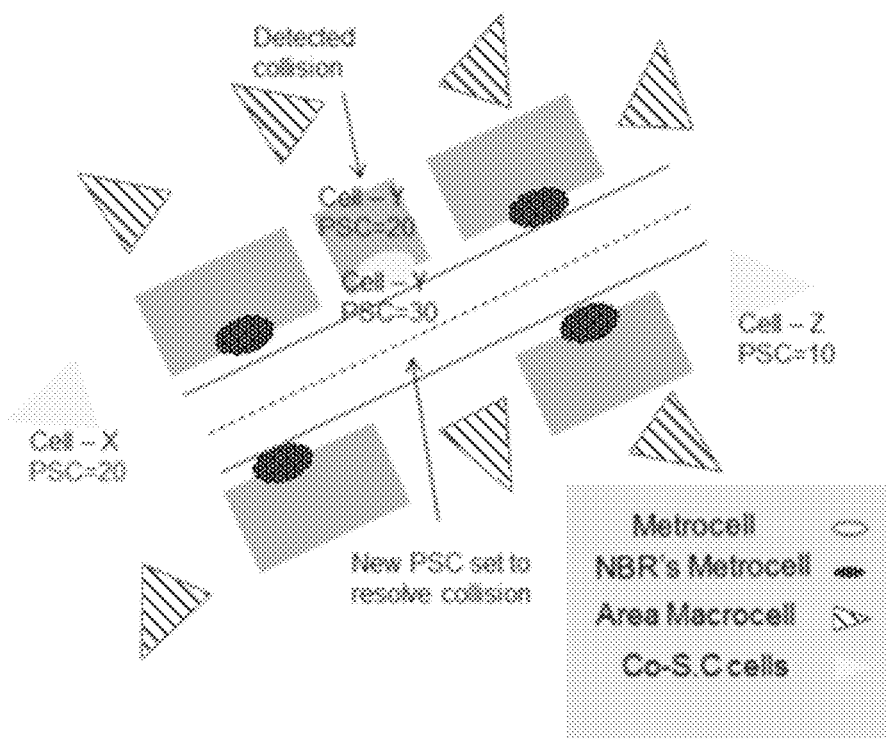
FIG. 5—illustrates an example for a PLI collision resolution by the computational platform of the present invention.

FIG. 5 illustrates an example for a PSC collision resolution by the computational platform. Let us assume that in this example, PSC=20 was available in the area illustrated in FIG. 5, and was allocated by the computational platform to cell Y. Now, a new macro site (cell X) has been deployed, and configured to use the very same PSC. The computational platform detects that both cell X and cell Y are now using PSC=20 and recalculates the free PSC list in the area. Following this recalculation, the computational platform is able to change (or rather propose a change) of the PSC for cell Y from PSC=20 to PSC=30. In this example, cell Y is a grid gateway cell having a unique PSC allocation.

Similar PSC collision resolution may occur also for inner grid cells. In case the computational platform detects that a PSC it has assigned in the PSC list for small cells is no longer available (free), a new PSC list would be calculated and applied in order to provide the inner grid cells with a new PSC.

Figure 6:
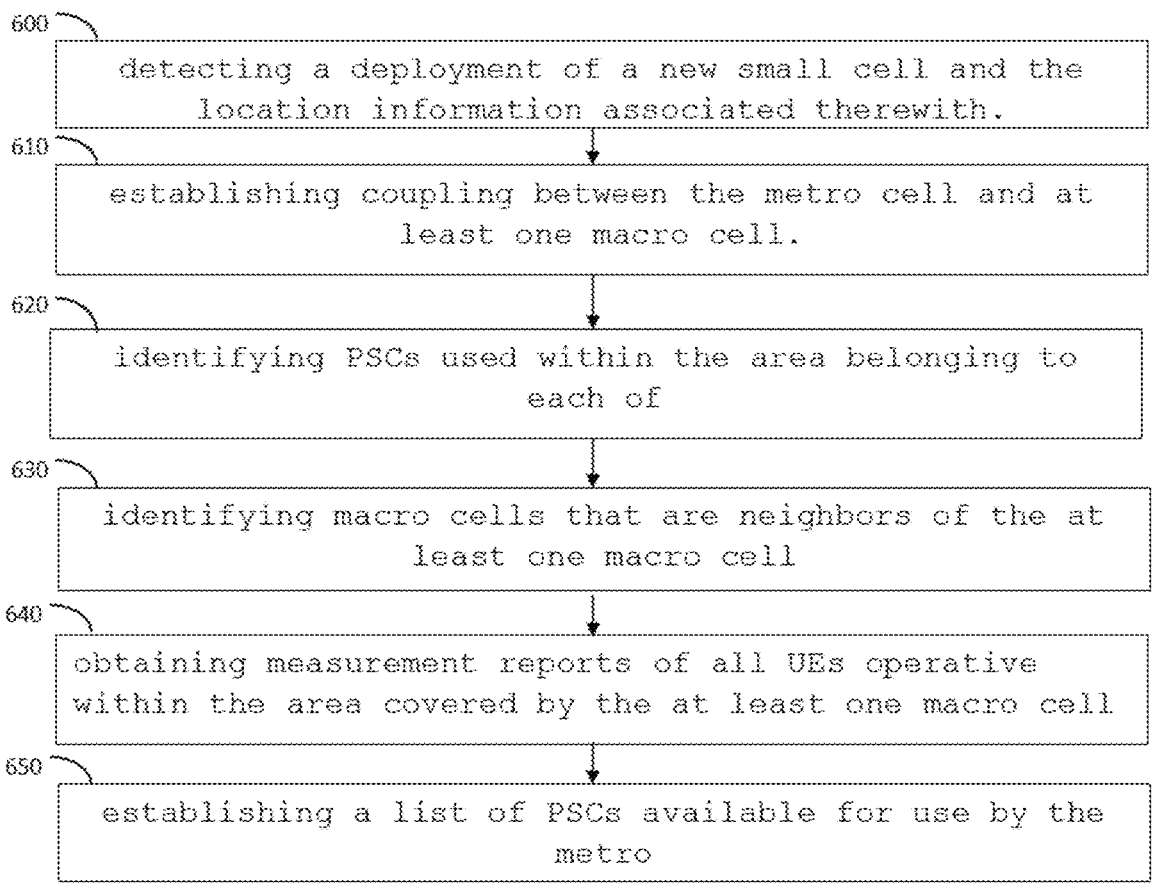
FIG. 6—exemplifies an embodiment of a method for carrying out a certain aspect of present the invention.

The following example (FIG. 6) illustrates one embodiment of a method for carrying out the present invention. In an heterogeneous RAN ("Het Net") comprising at least one macro cell and a plurality of small cells, the following steps are taken in order to enable dynamic assignment of PSCs to the small cells while eliminating or at least minimizing conflicts that might arise (scenarios of collisions and/or confusion) due to the use of the same PSC by two or more transmitting entities.

Step 600: detecting a deployment of a new small cell (i.e. a metro cell) and the location information associated therewith.

Step 610: establishing coupling between the metro cell and at least one macro cell, wherein the metro cell may be subjected to interferences induced by the base station(s) serving the at least one macro cell.

Step 620: identifying PSCs used within the area belonging to each of the at least one macro cell by the respective base station(s) of the at least one macro cell and the base station of the metro cells.

Step 630: identifying macro cells that are neighbors of the at least one macro cell.

Step 640: obtaining measurement reports of all UEs operative within the area covered by the at least one macro cell.

Step 650: establishing a list of PSCs available for use by the metro cell.

Step 660: configuring the metro cell with a unique PSC from among the established list, thereby allowing that metro cell to serve as a gateway for carrying out a handover procedure for a UE moving between the macro cell and one of the metro cells belonging to the grid to which that metro cell belongs.

According to an embodiment of the invention, a group of inner-grid small cells is included in the neighbors' relations list under a single entry associated with a single PLI (e.g. a single PSC).

In summary, a major drawback of prior art solutions relating to the use of small cells, is their inability to accurately plan PLIs for small cells, and that they do not enable finding enough free PLIs within dense areas. The solution provided by the present invention on the other hand, offers the ability to use real measurements taken from UEs connected to the macro cells in the specific location and optionally real measurements taken from UEs connected to the small cells in that specific location, for obtaining accurate detection of free PLIs. The PLI lists are created dynamically per area, and do not require reserving codes on a network level for use by the small cells.

Implementing configurable policy (e.g. thresholds for RSCP, Ec/No and frequency of missing neighbor events) enables finding and allocating additional available PLIs for indoor small cells. Thus, the solution provided by the present invention allows automatic configuration of scrambling codes for new and existing small cells in the network.

Figure 7:
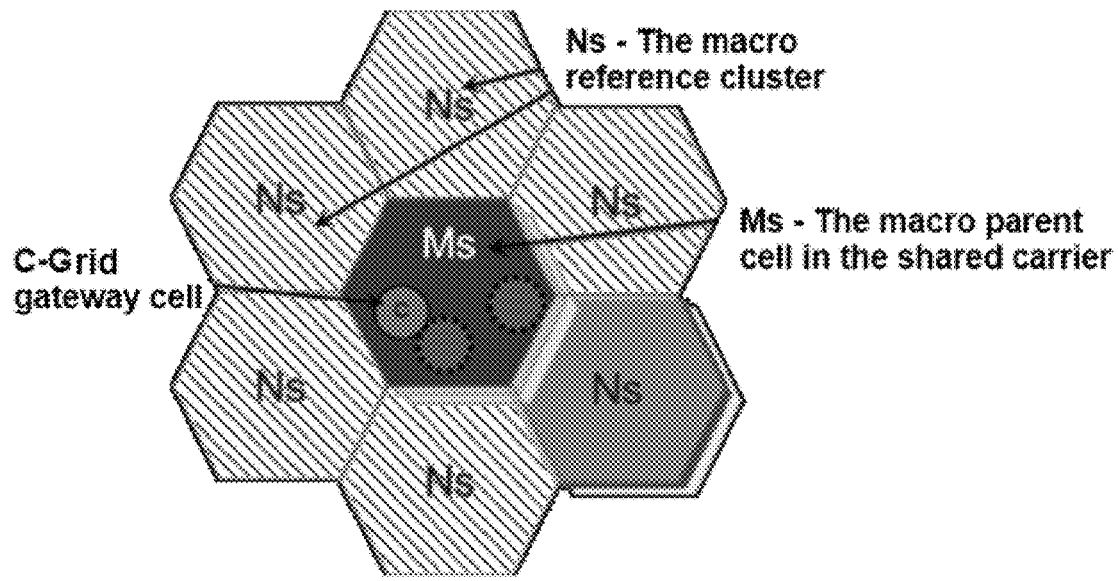
FIG. 7—exemplifies a HetNet comprising a small cell grid, the parent macro cell and a macro cell cluster.

According to another embodiment the processor of the computational platform (or of a different computational platform) is further operative to establish a neighbor relations' list that matches the actual PLI allocation provided by the computational platform, in a HetNet as illustrated for example in FIG. 7. These neighbors' relations are automatically and dynamically created by the computational platform for the macro cells to allow UEs to re-select and perform handover to the small cells. Thus the device and the application for creating and maintaining neighbors' lists provided by this embodiment, allow reselection and handover between macro cells and small cell grids in the area.

By this embodiment, the allocation of PLIs for the small cells takes into consideration not only the PLIs which are available for use, but also the available macro neighbors' list entries. The actual number of allocated PLIs may be less than the detected available PLIs. For example, because of size restrictions imposed on the neighbors' list by the air interface standard or in accordance with the configurable operator policy. Following this embodiment allows the operator to provide enhanced mobility robustness and QoE in HetNets as those described above.

Figure 8:
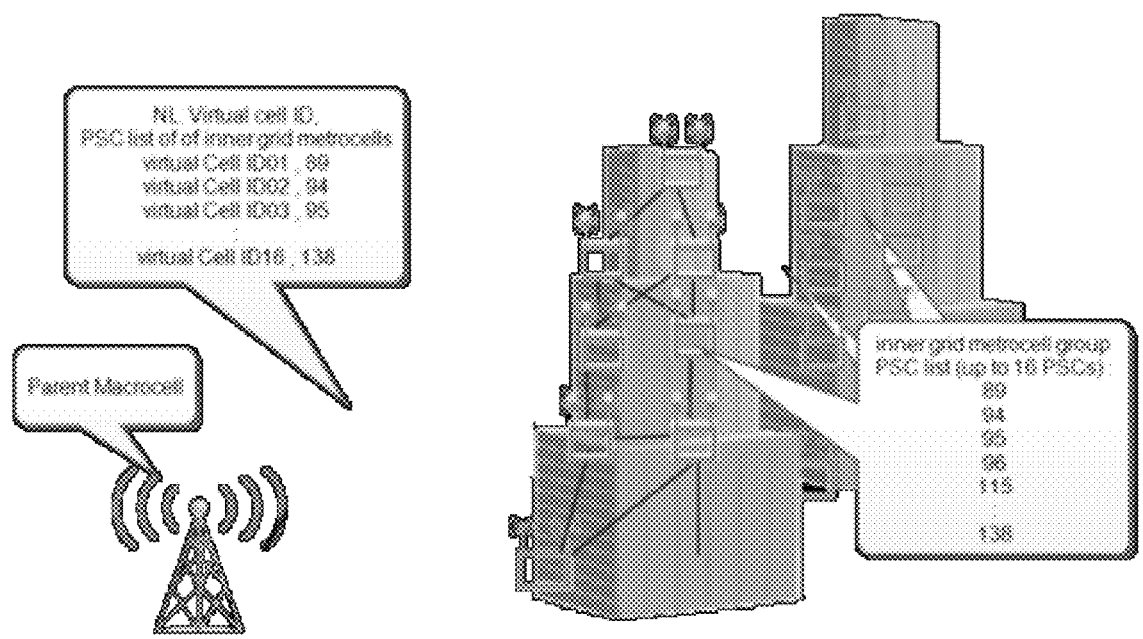
FIG. 8—illustrates the use of a general neighbor relations list defined between the serving macro cells and a group of inner-grid small cell.

An example of neighbors' relations between serving macro cells and inner-grid small cells is shown in FIG. 8. The creation and maintenance of the neighbors' lists may be carried out according to the following steps:

(1) Checking for new small cells in the network by synchronizing with the small cells' Operating Support System ("OSS"). When a new small cell is identified the application automatically identifies the macro "parent" cell(s) using a combination of geographic location and small cell measurements.

(ii) Classifying the small cells as being grid gateway cells or inner grid cells. As explained above, the grid gateway cells will be used for the 'hand in' process, i.e. handing the call (data connection) over from the macro cells to the small cells comprised in the inner grid. In the example of an in-building deployment—the grid gateway cell(s) would typically be located at the entry to the building, and the "inner grid" cells would be located on the different floors/areas of the building.

Creating Neighbors' Lists

The device (or software application as the case may be) creates a non-ambiguous neighbor's relation (list) to each grid gateway cell in the macro "parent" cell (the macro cell to be associated therewith). This neighbors' relation would be created with the allocated PLI and the actual cell ID of the grid gateway cell. Relations to the inner grid cells (according to the allocated PLI list) are added using "virtual cell IDs" i.e. Cell IDs allocated by the operator for groups of small cells in the area.

The processor operative to create and maintain the neighbors' list takes air interface limitations into account when creating the neighbor relations, and where necessary, clears room in the neighbor list by removing the least used neighbor relations from the "parent" cell's neighboring list ("NL"). The operator may control the neighbors' deletion by defining a threshold for allowing such deletion of an existing relation. The processor creates the right neighbors' relations only when they are indeed relevant—i.e. only when small cells have been actually been deployed, and/or only when they are active. This way, the processor avoids deletion of existing neighbors' relations in areas where no small cells are deployed, which in-turn could increase the Drop-Call Rate (DCR).

The total number of neighbors that can be stored in a Neighbors' List ("NL") is limited, and already contains inter, intra and IRAT neighbors. Implementing a small cells solution require adding the small cells located in the area to the existing neighbors' lists to allow handover/reselection.

According to prior art solution, the operators can choose one of the following methods:

1. To add manually small cell neighbors to the macro cells when (or near) the small cell are deployed, i.e. when the small cells are introduced to the network. The major drawback of this method is that it is not scalable for mass deployment of small cells.

2. To create the same small cells' neighbor relations for every neighbors' list across the entire heterogeneous network. This approach can be used only if a large enough set of PLIs could have been "carved out" from the macro throughout the entire het net (which is typically not the case). This approach means deleting other neighbor relations throughout the entire network, including in areas where no small cells are deployed, which may cause unnecessary DCR increase.

3. The operators may also manually create neighbor relations to the grid gateway cells. However, this solution is also not scalable, and is prone to errors.

When used without the PLI allocation for the small cells functionality, as may be done according to an embodiment of the present invention, neighbors' relations are automatically created to groups of small cells, using virtual cell IDs, located within all macro cells in a defined area. The area can be defined for example by the operator, thus limiting the additional relations to areas where small cells deployment is planned and the operator has enough knowledge about.

However, when implemented together with the PLI allocation for the small cells functionality—grid gateway cells are identified, and a unique neighbor relation from the "parent" macro cell is created to enable hand-in from the macro (cellular) network. In the alternative, one can have the solution of the present invention implemented by only creating relations per actual physical layer identifiers (PLIs) allocated for small cells under the macro site. This will optimize the number of neighbors allocated in the macro cell and will avoid needlessly deleting other neighbor relations in areas where small cells have not been deployed. The processor operative to create and maintain the neighbors' list notifies the processor responsible for the PSC allocation for the small cells functionality on the number of neighbor relations that can be created within the macro cell (to meet air interface limitation and the defined operator policy) such that PSC list would be allocated accordingly. It should be noted, that in dense urban areas less PSCs and less entries in the NL are expected to be available. The processor operative to create and maintain the neighbors' list will only create relations to allocated PSCs and will delete fewer entries in the macro cells. Relations will be deleted only if the frequency of their usage is below a configurable threshold.

In summary, the prior art solutions are unable to accurately plan neighbor relations between macro cells, and small cells, as these lists are dynamic in nature, and require a case-by-case examination in order to allocate the optimal number of small cell neighbors, and to identify grid gateway cells.

The embodiment provided by the present invention when the functionality of creating and maintaining the neighbors' list is operative in conjunction with the PLI allocation for the small cells functionality for managing heterogeneous networks provides consistent, up to date optimal neighbor relations for the small cells deployed under macro network produced by any vendor. It enables smooth handover via grid gateway cells, and reselection of any small cell, with minimal impact on the neighbor lists of the macro network.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention in any way. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. A method for managing a heterogeneous cellular network comprising at least one macro cell and a plurality of small cells, the method comprising:
   defining a geographical area and identifying all macro cells included within the defined geographical area;
   obtaining, by a management entity, measurement reports generated by wireless entities currently operating within the defined geographical area, wherein the measurement reports comprise information associated, at least in part, with a measured signal intensity at which communication signals are received by each respective one of the wireless entities from each respective base stations serving all macro cells and all small cells of the plurality of small cells included within the defined geographical area;

based on the measurement reports obtained, creating one or more neighbors' relations lists for groups of small cells located within all macro cells included in the defined geographical area by using virtual cell identifiers (IDs) for small cells belonging to the groups; and selecting, by the management entity, at least one small cell to be a gateway cell for a particular group of small cells located in a vicinity of at least one macro cell served by a base station, wherein the at least one small cell is selected to be the gateway cell based, at least in part, on a measured signal intensity at which communication signals received from the base station serving the at least one macro cell have the highest measured signal intensity from the measurement reports of any other small cell among the particular group of small cells and wherein the gateway cell is configured with a unique physical layer identifier (PLI) selected from a list of available PLIs that are not currently used by the at least one macro cell or the particular group of small cells.

2. The method of claim 1, further comprising: dynamically updating the one or more neighbors' relations lists established in response to a change detected in measurement reports.

3. The method of claim 1, further comprising: selecting a plurality of other small cells from the plurality of small cells to be a group of inner-grid cells associated with the gateway cell, wherein the gateway cell is selected to handle handover for wireless entities from the base station serving the at least one macro cell to the particular group of small cells.

4. The method of claim 3, wherein the group of inner-grid small cells is included in the neighbors' relations list under a single entry associated with the unique PLI of the gateway cell.

5. The method of claim 1, wherein the measured signal intensity is associated with the measured signal intensity at which the communication signals transmitted by the base station serving the at least one macro cell are received by one or more wireless entities in a vicinity of the gateway cell.

6. The method of claim 1, wherein the measured signal intensity is associated with the measured signal intensity at which the communication signals transmitted by the base station serving the at least one macro cell are received by the gateway cell.

7. One or more non-transitory tangible media encoding logic that includes instructions for execution by a processor, wherein the execution causes the processor to perform operations for managing a heterogeneous cellular network comprising at least one macro cell and a plurality of small cells, the operations comprising:

defining a geographical area and identifying all macro cells included within the defined geographical area;

obtaining, by a management entity, measurement reports generated by wireless entities currently operating within the defined geographical area, wherein the measurement reports comprise information associated, at least in part, with a measured signal intensity at which communication signals are received by each respective one of the wireless entities from each respective base station serving all macro cells and all small cells of the plurality of small cells included within the defined geographical area;

based on the measurement reports obtained, creating one or more neighbors' relations lists for groups of small cells located within all macro cells included in the defined geographical area by using virtual cell identifiers (IDs) for small cells belonging to the groups;

and selecting, by the management entity, at least one small cell to be a gateway cell for a particular group of small cells located in a vicinity of at least one macro cell served by a base station, wherein the at least one small cell is selected to be the gateway cell based, at least in part, on a measured signal intensity at which communication signals received from the base station serving the at least one macro cell have the highest measured signal intensity from the measurement reports of any other small cell among the particular group of small cells and wherein the gateway cell is configured with a unique physical layer identifier (PLI) selected from a list of available PLIs that are not currently used by the at least one macro cell or the particular group of small cells.

8. The media of claim 7, wherein the execution causes the processor to perform further operations, comprising: dynamically updating the one or more neighbors' relations lists established in response to a change detected in measurement reports.

9. The media of claim 7, wherein the execution causes the processor to perform further operations, comprising: selecting a plurality of other small cells from the plurality of small cells to be a group of inner-grid cells associated with the gateway cell, wherein the gateway cell is selected to handle handover for wireless entities from the base station serving the at least one macro cell to the particular group of small cells.

10. The media of claim 9, wherein the group of inner-grid small cells is included in the neighbors' relations list under a single entry associated with the unique PLI of the gateway cell.

11. The media of claim 9, wherein the measured signal intensity is associated with the measured signal intensity at which the communication signals transmitted by the base station serving the at least one macro cell are received by one or more wireless entities in a vicinity of the gateway cell.

12. The media of claim 9, wherein the measured signal intensity is associated with the measured signal intensity at which the communication signals transmitted by the base station serving the at least one macro cell are received by the gateway cell.

13. A system for managing a heterogeneous cellular network comprising at least one macro cell and a plurality of small cells, the system comprising a computing platform being in communication with the heterogeneous cellular network and being configured for:

defining a geographical area and identifying all macro cells included within the defined geographical area;

obtaining, by the computing platform, measurement reports generated by wireless entities currently operating within the defined geographical area, wherein the measurement reports comprise information associated, at least in part, with a measured signal intensity at which communication signals are received by each respective one of the wireless entities from each respective base station serving all macro cells and all small cells of the plurality of small cells included within the defined geographical area;

based on the measurement reports obtained, creating one or more neighbors' relations lists for groups of small cells located within all macro cells included in the defined geographical area by using virtual cell identifiers (IDs) for small cells belonging to the groups;

and selecting, by the computing platform, at least one small cell to be a gateway cell for a particular group of small cells located in a vicinity of at least one macro cell served by a base station, wherein the at least one small cell is selected to be the gateway cell based, at least in part, on a measured signal intensity at which communication signals received from the base station serving the at least one macro cell have the highest measured signal intensity from the measurement reports of any other small cell among the particular group of small cells and wherein the gateway cell is configured with a unique physical layer identifier (PLI) selected from a list of available PLIs that are not currently used by the at least one macro cell or the particular group of small cells.

14. The system of claim 13, being further configured for: dynamically updating the one or more neighbors relations lists established in response to a change detected in measurement reports.

15. The system of claim 13, being further configured for: selecting a plurality of other small cells from the plurality of small cells to be a group of inner-grid cells associated with the gateway cell, wherein the gateway cell is selected to handle handover for wireless entities from the base station serving the at least one macro cell to the particular group of small cells.

16. The system of claim 15, wherein the group of inner-grid small cells is included in the neighbors' relations list under a single entry associated with the unique PLI of the gateway cell.

17. The system of claim 13, wherein the measured signal intensity is associated with the measured signal intensity at which the communication signals transmitted by the base station serving the at least one macro cell are received by one or more wireless entities in a vicinity of the gateway cell.

18. The system of claim 13, wherein the measured signal intensity is associated with the measured signal intensity at which the communication signals transmitted by the base station serving the at least one macro cell are received by the gateway cell.

* * * * *